(12) United States Patent
Sakamoto et al.

(10) Patent No.: US 11,959,994 B2
(45) Date of Patent: Apr. 16, 2024

(54) ELECTRONIC APPARATUS, METHOD, AND ELECTRONIC SYSTEM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Takafumi Sakamoto, Tokyo (JP); Yuki Yonezawa, Kanagawa (JP); Tomohiro Tobari, Kanagawa (JP); Takanori Kouta, Tokyo (JP)

(73) Assignees: KABUSHIKI KAISHA TOSHIBA, Tokyo (JP); TOSHIBA ENERGY SYSTEMS & SOLUTIONS CORPORATION, Kanagawa (JP)

(*) Notice: Subject to any disclaimer, the term of this patent is extended or adjusted under 35 U.S.C. 154(b) by 522 days.

(21) Appl. No.: 17/194,061

(22) Filed: Mar. 5, 2021

(65) Prior Publication Data
US 2021/0190927 A1 Jun. 24, 2021

Related U.S. Application Data

(63) Continuation of application No. PCT/JP2019/024165, filed on Jun. 18, 2019.

(51) Int. Cl.
G01S 11/06 (2006.01)
G01S 5/02 (2010.01)
(Continued)

(52) U.S. Cl.
CPC ............ G01S 11/06 (2013.01); G01S 5/0284 (2013.01); H04W 4/029 (2018.02)

(58) Field of Classification Search
CPC ....... G01S 11/06; G01S 5/0284; H04W 4/029
(Continued)

(56) References Cited

U.S. PATENT DOCUMENTS 7,092,726 B2   8/2006   Shi et al.
8,237,612 B2   8/2012   Lin et al.
(Continued)

FOREIGN PATENT DOCUMENTS

CN   107923970 A   *   4/2018   .............. G01S 11/06
JP   2008224489 A       9/2008
(Continued)

OTHER PUBLICATIONS

Related U.S. Appl. No. 17/188,053; First Named Inventor: Yuki Yonezawa; Title: "Electronic Apparatus, Method, and Electronic System", filed Mar. 1, 2021.
(Continued)

Primary Examiner — Harry K Liu
(74) Attorney, Agent, or Firm — Holtz, Holtz & Volek PC

(57) ABSTRACT

According to one embodiment, an electronic apparatus includes a processor. The processor is configured to acquire position information indicating first and second installation positions of a plurality of pieces of equipment receive characteristic information of a first piece of equipment obtained from a first propagation characteristic and a second propagation characteristic, and characteristic information of a second piece of equipment obtained from a third propagation characteristic and a fourth propagation characteristic. The processor is configured to estimate a position where each of the first and second pieces of equipment is installed, based on the position information, and the characteristic information of the first and the second piece of equipment.

14 Claims, 11 Drawing Sheets

(51) Int. Cl.
*H04W 4/02* (2018.01)
*H04W 4/029* (2018.01)

(58) Field of Classification Search
USPC .......................................................... 342/451
See application file for complete search history.

(56) References Cited

U.S. PATENT DOCUMENTS

| | | | |
|---|---|---|---|
| 9,807,849 | B2 | 10/2017 | Bhatkar et al. |
| 2002/0122003 | A1 | 9/2002 | Patwari et al. |
| 2004/0236547 | A1 | 11/2004 | Rappaport et al. |
| 2015/0105086 | A1 | 4/2015 | Thiel et al. |
| 2016/0337888 | A1 | 11/2016 | Zhang et al. |
| 2017/0041740 | A1 | 2/2017 | Kanayama et al. |
| 2017/0052247 | A1 | 2/2017 | Kong et al. |
| 2018/0041985 | A1 | 2/2018 | Davaadorj et al. |
| 2019/0095852 | A1 | 3/2019 | Sanjay et al. |
| 2019/0274116 | A1 | 9/2019 | Hayashikoshi et al. |
| 2019/0383896 | A1 | 12/2019 | Han |
| 2021/0194423 | A1 | 6/2021 | Yonezawa et al. |

FOREIGN PATENT DOCUMENTS

| | | | | |
|---|---|---|---|---|
| JP | 2012173070 A | 9/2012 | | |
| JP | 2017032469 A | 2/2017 | | |
| JP | 2017181287 A | 10/2017 | | |
| WO | WO-2018069208 A1 * | 4/2018 | ............ | G01S 1/042 |
| WO | 2018123970 A1 | 7/2018 | | |

OTHER PUBLICATIONS

Sakagami, et al., "On the Approximation Algorithm for Traveling Salesman Problem", Research Reports of the Faculty of Engineering, Mie University (vol. 25), 2000, pp. 81-96, http://hdl.handle.net/10076/4091.

Yonezawa, et al., "BluMatch: Wireless Equipment Self-Positioning Estimation Without Using Anchor Nodes", IPSJ Symposium Series: Multimedia, Distributed, Cooperative and Mobile Symposium (DICOMO2016) (vol. 2016), 2016, pp. 123-128.

Bui, et al., "A localization algorithm with learning-based distances", Proceedings. 14th International Conference on Computer Communications and Networks, 2005. pp. 569-574.

Office Action (Non-Final Rejection) dated Sep. 14, 2023, issued in related U.S. Appl. No. 17/188,053.

* cited by examiner

~103

| Set position ID | X coordinate | Y coordinate |
|---|---|---|
| P1 | 1 | 1 |
| P2 | 1 | 2 |
| P3 | 1 | 3 |
| P4 | 3 | 1 |
| P5 | 3 | 2 |
| P6 | 3 | 3 |
| P7 | 5 | 1 |
| P8 | 5 | 2 |
| P9 | 5 | 3 |

FIG. 5

|   | Transmission side wireless machine |||||||||
|---|---|---|---|---|---|---|---|---|---|
|   | D1 | D2 | D3 | D4 | D5 | D6 | D7 | D8 | D9 |
| D1 |    | -50 | -55 | -70 | -75 | -77 | -90 | -95 | -100 |
| D2 | -50 |   | -54 | -75 | -73 | -77 | -93 | -90 | -95 |
| D3 | -57 | -52 |   | -72 | -70 | -69 | -94 | -93 | -90 |
| D4 | -70 | -72 | -75 |   | -50 | -53 | -70 | -72 | -77 |
| D5 | -72 | -70 | -74 | -49 |   | -30 | -73 | -72 | -73 |
| D6 | -79 | -78 | -74 | -59 | -50 |   | -77 | -72 | -70 |
| D7 | -93 | -95 | -100 | -72 | -74 | -77 |   | -45 | -50 |
| D8 | -95 | -92 | -95 | -80 | -79 | -81 | -50 |   | -52 |
| D9 | -100 | -95 | -93 | -82 | -77 | -76 | -58 | -55 |   |
(Reception side wireless machine — rows; 102a–102i)
F I G. 7
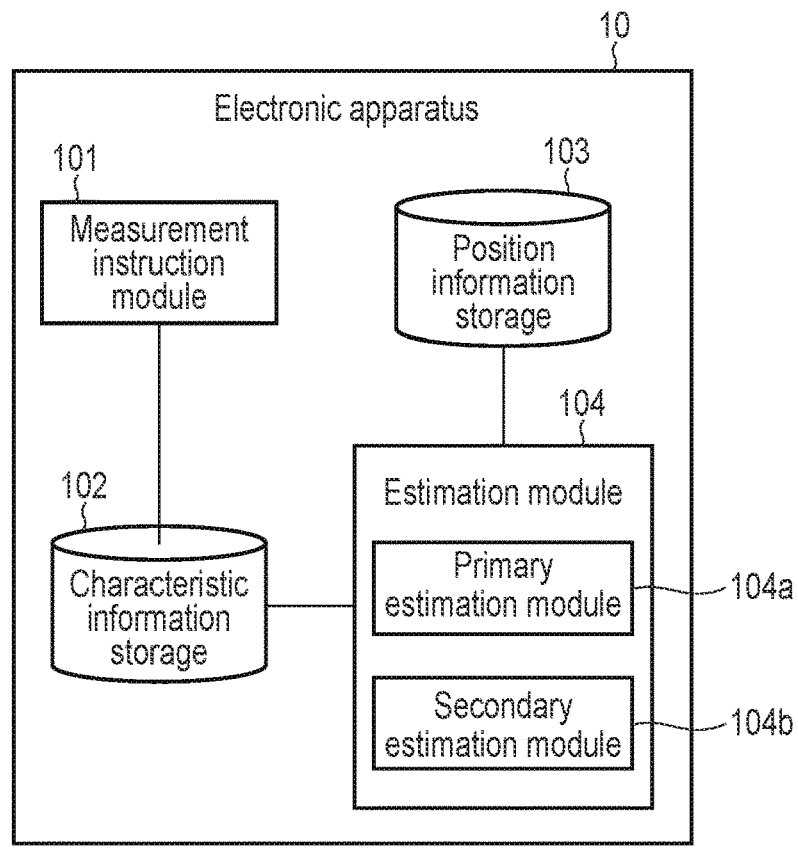
F I G. 8

Measurement channel number 1   Transmission side wireless machine

|  | D1 | D2 | D3 | D4 | D5 | D6 | D7 | D8 | D9 |
|---|---|---|---|---|---|---|---|---|---|
| D1 |  | -48 | -53 | -68 | -73 | -75 | -88 | -93 | -98 |
| D2 | -48 |  | -52 | -73 | -71 | -75 | -91 | -88 | -93 |
| D3 | -55 | -50 |  | -70 | -68 | -67 | -92 | -91 | -88 |
| D4 | -68 | -70 | -73 |  | -48 | -51 | -68 | -70 | -75 |
| D5 | -70 | -68 | -72 | -47 |  | -28 | -71 | -70 | -71 |
| D6 | -77 | -76 | -72 | -57 | -48 |  | -75 | -70 | -68 |
| D7 | -91 | -93 | -98 | -70 | -72 | -75 |  | -43 | -48 |
| D8 | -93 | -90 | -93 | -78 | -77 | -79 | -48 |  | -50 |
| D9 | -98 | -93 | -91 | -80 | -75 | -74 | -56 | -53 |  |

Reception side wireless machine

Measurement channel number 2   Transmission side wireless machine

|  | D1 | D2 | D3 | D4 | D5 | D6 | D7 | D8 | D9 |
|---|---|---|---|---|---|---|---|---|---|
| D1 |  | -48 | -58 | -68 | -77 | -80 | -91 | -93 | -97 |
| D2 | -51 |  | -52 | -72 | -71 | -77 | -95 | -90 | -93 |
| D3 | -57 | -54 |  | -70 | -69 | -67 | -90 | -93 | -87 |
| D4 | -67 | -72 | -73 |  | -50 | -57 | -73 | -73 | -77 |
| D5 | -75 | -70 | -70 | -49 |  | -48 | -73 | -77 | -70 |
| D6 | -78 | -77 | -70 | -59 | -50 |  | -77 | -72 | -69 |
| D7 | -91 | -94 | -91 | -75 | -74 | -76 |  | -45 | -50 |
| D8 | -94 | -90 | -95 | -70 | -79 | -75 | -46 |  | -49 |
| D9 | -96 | -95 | -90 | -80 | -73 | -70 | -54 | -50 |  |

Reception side wireless machine

⋮

F I G. 10

|  | Set position | P1 | P2 | P3 | P4 | P5 | P6 |
|---|---|---|---|---|---|---|---|
| Primary estimation result (measurement channel number 1) | Wireless machine ID | D1 | D2 | D3 | D4 | D5 | D6 |
| Primary estimation result (measurement channel number 2) | Wireless machine ID | D1 | D2 | D6 | D3 | D4 | D5 |
| Primary estimation result (measurement channel number 3) | Wireless machine ID | D1 | D5 | D3 | D2 | D6 | D4 |
| Secondary estimation result | Wireless machine ID | D1 | D2 | D3 | | | |

F I G. 12

|  | Set position | P1 | P2 | P3 | P4 | P5 | P6 |
|---|---|---|---|---|---|---|---|
| Primary estimation result (measurement channel number 1) | Wireless machine ID | D1 | D2 | D3 | D4 | D5 | D6 |
| Primary estimation result (measurement channel number 2) | Wireless machine ID | D1 | D2 | D6 | D3 | D4 | D5 |
| Primary estimation result (measurement channel number 3) | Wireless machine ID | D1 | D5 | D3 | D2 | D6 | D4 |
| Secondary estimation result | Wireless machine ID | D1 | D2 | D3 | | | |

|  | Set position | P1 | P2 | P3 | P4 | P5 | P6 |
|---|---|---|---|---|---|---|---|
| Primary estimation result (measurement channel number 1) | Wireless machine ID | D1 | D2 | D3 | D4 | D5 | D6 |
| Primary estimation result (measurement channel number 2) | Wireless machine ID | D1 | D2 | D3 | D5 | D4 | D6 |
| Primary estimation result (measurement channel number 3) | Wireless machine ID | D1 | D2 | D3 | D4 | D5 | D6 |
| Secondary estimation result | Wireless machine ID | D1 | D2 | D3 | D4 | D5 | D6 |

F I G. 13

ELECTRONIC APPARATUS, METHOD, AND ELECTRONIC SYSTEM

CROSS-REFERENCE TO RELATED APPLICATIONS

This application is a Continuation Application of PCT Application No. PCT/JP2019/024165, filed Jun. 18, 2019, the entire contents of which are incorporated herein by reference.

FIELD

Embodiments described herein relate generally to an electronic apparatus, a method, and an electronic system.

BACKGROUND

In recent years, it is known to measure propagation characteristics (e.g., RSSI) among a plurality of wireless machines and estimate the position where each of the plurality of wireless machines is installed.

However, for example, in an environment with much reflection of radio waves, a phenomenon called multipath fading, in which direct waves and reflected waves interfere with each other, occurs, and the estimation accuracy of the position of the wireless machine described above is sometimes lowered.

BRIEF DESCRIPTION OF THE DRAWINGS

FIG. 5 shows an example of a data structure of position information stored in position information storage.

FIG. 7 shows an example of a data structure of characteristic information stored in characteristic information storage.

FIG. 8 is a block diagram showing an example of a functional configuration of an electronic apparatus according to a second embodiment.

FIG. 10 shows an example of the data structure of the characteristic information stored in the characteristic information storage.

FIG. 12 is a view for specifically explaining the secondary estimation processing.

FIG. 13 is a view for explaining an example of re-estimation processing.

DETAILED DESCRIPTION

In general, according to one embodiment, an electronic apparatus includes a processor. The processor is configured to acquire position information indicating a plurality of installation positions including first and second installation positions of a plurality of pieces of equipment, receive characteristic information of a first piece of equipment among the plurality of pieces of equipment obtained from a first propagation characteristic in a first channel of the first piece of equipment and a second propagation characteristic in a second channel of the first piece of equipment, receive characteristic information of a second piece of equipment among the plurality of pieces of equipment obtained from a third propagation characteristic in the first channel of the second piece of equipment and a fourth propagation characteristic in the second channel of the second piece of equipment. The processor is configured to estimate a position where each of the first and second pieces of equipment is installed from among the first and second installation positions, based on the position information, the characteristic information of the first piece of equipment, and the characteristic information of the second piece of equipment.

Various embodiments will be described hereinafter with reference to the accompanying drawings.

First Embodiment

First, the first embodiment will be described. The electronic apparatus according to the present embodiment is used, for example, in a case where a plurality of wireless machines are installed at a plurality of predetermined installation positions, to estimate (specify) the position where each of the plurality of wireless machines is installed from among the plurality of installation positions.

Hereinafter, an example of the usage mode of the electronic apparatus according to the present embodiment will be specifically described with reference to FIG. 1. Here, a case where the electronic apparatus according to the present embodiment is used in a lighting equipment system will be described.

Figure 1:
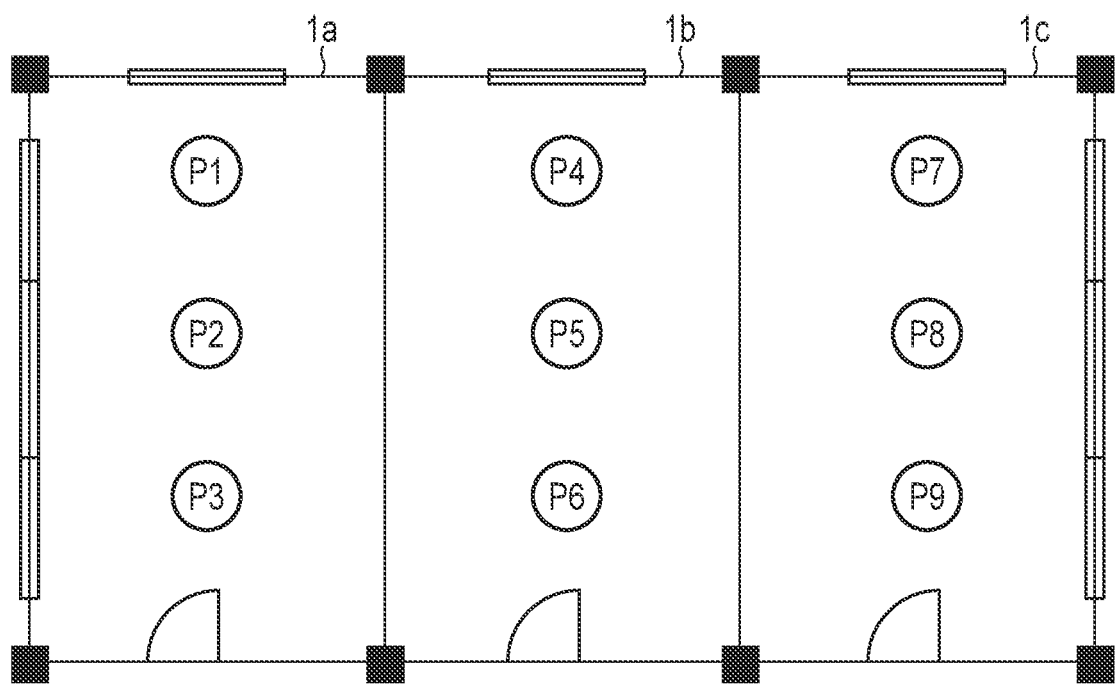
FIG. 1 is a view for specifically explaining an example of a usage mode of an electronic apparatus according to a first embodiment.

FIG. 1 shows a plurality of rooms 1a to 1c and positions P1 to P9 of lighting equipment arranged in the respective rooms 1a to 1c. In the example shown in FIG. 1, the lighting equipment is arranged at each of the positions P1 to P3 of the room 1a, the lighting equipment is arranged at each of the positions P4 to P6 of the room 1b, and the lighting equipment is arranged at each of the positions P7 to P9 of the room 1c.

Here, a case where in the lighting equipment system, for example, a wireless machine is installed in the lighting equipment arranged in each of the rooms 1a to 1c, and the power on/off of the lighting equipment is controlled (remotely operated) via the wireless machine is assumed. Note that each wireless machine may communicate via an appropriately installed wireless master unit, or may communicate by configuring a wireless mesh network.

In such a case, for example, when controlling only the lighting equipment installed in the room 1a, it is necessary to transmit a control signal to the wireless machine installed in the positions P1 to P3 of the room 1a. When controlling only one of the three pieces of lighting equipment arranged in the room 1a, it is necessary to transmit a control signal to the wireless machine installed in the one piece of lighting equipment. The wireless machine installed in each piece of lighting equipment is assigned with an identifier (hereinafter referred to as a wireless machine ID) for identifying the wireless machine. Therefore, it is possible to transmit a control signal to a specific wireless machine by using the wireless machine 1D.

However, in the lighting equipment system described above, when the correspondence relationship between the wireless machine ID and the (arrangement position of) lighting equipment is unknown, it is impossible to discriminate the wireless machine that becomes the destination of the control signal when controlling a specific piece of lighting equipment.

In this case, it is conceivable that the correspondence relationship between the wireless machine ID and the lighting equipment is registered (set) in advance. However, considering that hundreds to thousands of pieces of lighting equipment are arranged in an office building, for example, it is very complicated for a worker to perform installation work while registering the wireless machine ID assigned to the wireless machine. It is also difficult to confirm and register the wireless machine ID assigned to a wireless machine after the wireless machine is installed.

Therefore, the electronic apparatus according to the present embodiment is used to estimate the position where each wireless machine is installed (i.e., the wireless machine ID assigned to the wireless machine installed at each installation position) from among the installation positions in a situation where it is known as to the position where the plurality of wireless machines are installed (hereinafter referred to as an installation position) as described above but it is unknown as to which wireless machine is installed at each of the installation positions (i.e., the correspondence relationship between the installation position and the wireless machine ID).

While an example in which the electronic apparatus according to the present embodiment is used in a lighting equipment system has been described here, the electronic apparatus according to the present embodiment may be used in a photovoltaic power generation system, for example.

Figure 2:
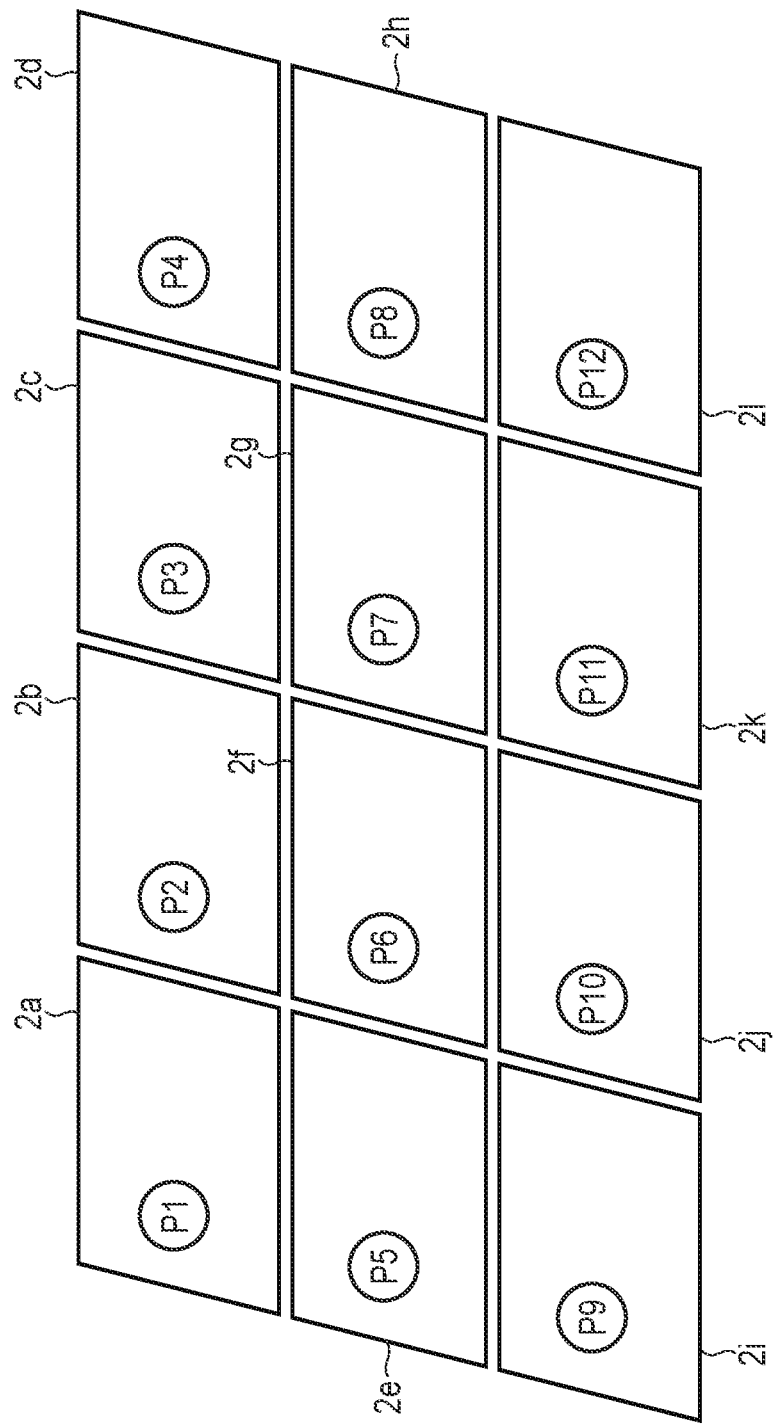
FIG. 2 is a view for specifically explaining another example of a usage mode of the electronic apparatus.

Specifically, in a case where a photovoltaic power generation system includes a plurality of solar panels 2a to 2l as shown in FIG. 2, for example, a wireless machine is sometimes installed in each of the plurality of solar panels 2a to 2l (i.e., positions P1 to P12). According to this, it is possible to collect the power generation amount, the temperature, and the like of each of the solar panels 2a to 2l via the wireless machine, and hence it is possible to monitor the state of each of the solar panels 2a to 2l (operation status, failure, or the like) based on the power generation amount, the temperature, and the like.

Even in such a case, unless the positions P1 to P12 where the plurality of respective wireless machines are installed can be discriminated, even in a case where the power generation amount corresponding to an abnormal value, for example, is received from a specific wireless machine, a broken solar panel (i.e., solar panel in which the abnormal value is detected) cannot be specified from among the solar panels 2a to 2l.

The electronic apparatus according to the present embodiment can also be used to estimate the position where each wireless machine is installed from among a plurality of installation positions (solar panel) in such a photovoltaic power generation system.

In addition to the above, the present embodiment can also be applied to a case where in an air conditioning system, a wireless machine is installed in a plurality of air conditioners, or a case where a wireless machine is installed in various facilities (air conditioner, motor, inverter, sensor, and the like) such as a train.

Figure 3:
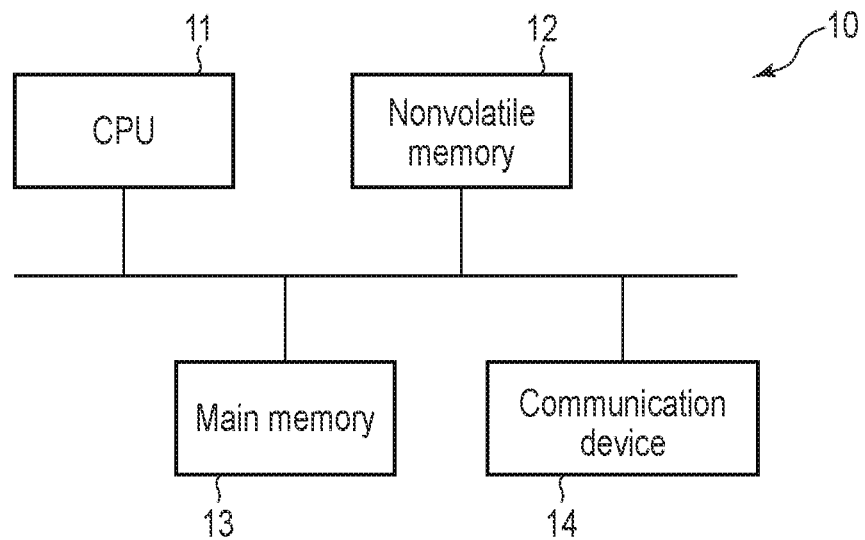
FIG. 3 is a diagram showing an example of a hardware configuration of the electronic apparatus.

Hereinafter, the electronic apparatus according to the present embodiment will be described in detail. FIG. 3 is a diagram showing an example of a hardware configuration of the electronic apparatus according to the present embodiment. As shown in FIG. 3, an electronic apparatus 10 includes a CPU 11, a nonvolatile memory 12, a main memory 13, and a communication device 14.

The CPU 11 is a hardware processor that controls the operation of each component in the electronic apparatus 10. The CPU 11 executes a program loaded from the nonvolatile memory 12, which is a storage device, to the main memory 13.

The communication device 14 is a device configured to execute wired or wireless communication. With this communication device 14, the electronic apparatus 10 is communicably connected with each of the plurality of wireless machines, and can transmit and receive various information (signals).

Note that the present embodiment assumes that the electronic apparatus 10 is connected with each of the plurality of wireless machines so as to be capable of wireless communication. However, the electronic apparatus 10 may be connected to a wireless access point via a wired network, for example, and the wireless access point may be connected with the plurality of wireless machines so as to be capable of wireless communication by constituting a star network. Each of the wireless machines may be connected by constituting a wireless mesh network. That is, in the present embodiment, as long as the electronic apparatus 10 is communicably connected with each of the plurality of wireless machines, wired communication may be executed in a part thereof.

Although only the nonvolatile memory 12 and the main memory 13 are shown in FIG. 3, the electronic apparatus 10 may include other storage devices such as a hard disk drive (HDD) and a solid state drive (SSD).

Although omitted in FIG. 3, the electronic apparatus 10 may further include an input device such as a mouse or a keyboard, and a display device such as a display.

Figure 4:
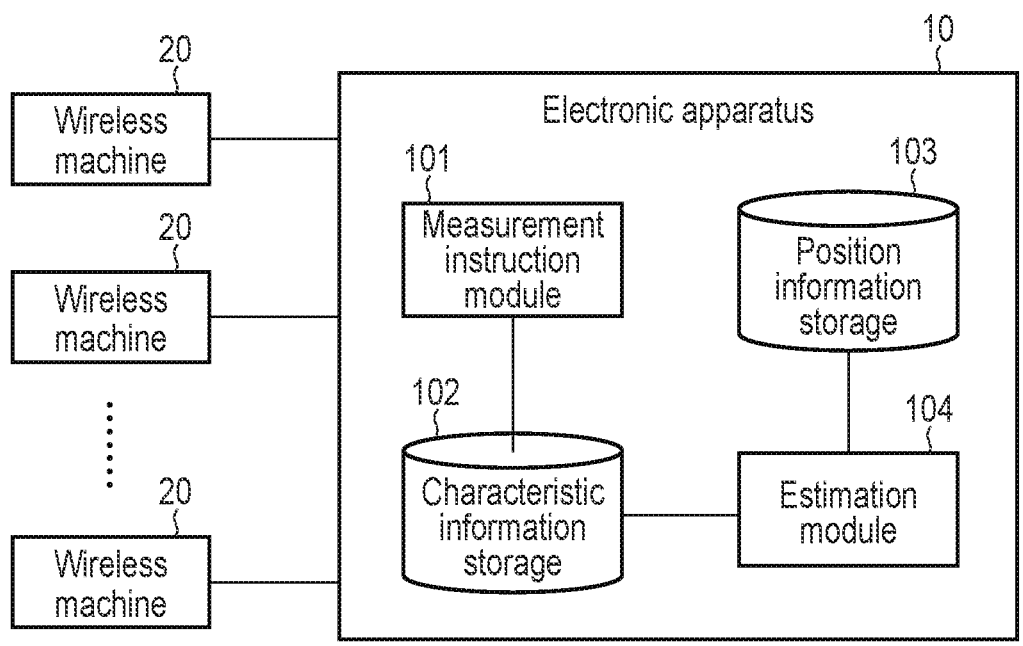
FIG. 4 is a block diagram showing an example of a functional configuration of the electronic apparatus.

FIG. 4 is a block diagram showing an example of the functional configuration of the electronic apparatus 10. As shown in FIG. 4, the electronic apparatus 10 includes a measurement instruction module 101, characteristic information storage 102, position information storage 103, and an estimation module 104.

Note that in the present embodiment, the electronic apparatus 10 is communicably connected with a plurality of wireless machines 20 as described above.

The present embodiment assumes that part or all of the measurement instruction module 101 and the estimation module 104 are implemented by causing the CPU 11 to execute a program, i.e., by software. Note that part or all of the modules 101 and 104 may be implemented by hardware such as an integrated circuit (IC), or may be implemented as a combination configuration of software and hardware.

The present embodiment assumes that the characteristic information storage 102 and the position information storage 103 shall be implemented by, for example, a nonvolatile memory 12 or another storage device.

The measurement instruction module 101 gives to each of the plurality of wireless machines 20 an instruction about a channel to be used for measuring propagation characteristics in each of the plurality of wireless machines 20. The measurement instruction module 101 receives, from each of the plurality of wireless machines 20, characteristic information obtained from the propagation characteristics measured by each of the plurality of wireless machines 20 using the instructed channel.

The characteristic information storage 102 stores the characteristic information received by the measurement instruction module 101.

The position information storage 103 stores in advance position information indicating the installation position where each of the plurality of wireless machines 20 is installed. The (installation position indicated by) position information stored in the position information storage 103 may be automatically extracted from, for example, a drawing showing the positions where the plurality of wireless machines 20 are installed, or may be input by a worker or the like who installs the plurality of wireless machines 20.

Based on the characteristic information stored in the characteristic information storage 102 and the position information stored in the position information storage 103, the estimation module 104 estimates the position where each of the plurality of wireless machines 20 is installed (i.e., correspondence relationship between the installation position and the wireless machine 20) from among a plurality of installation positions indicated by the position information. In other words, the estimation module 104 estimates the (wireless machine ID assigned to) wireless machine installed at the installation position for each installation position indicated by the position information.

FIG. 5 shows an example of the data structure of position information stored in the position information storage 103 shown in FIG. 4.

As shown in FIG. 5, the position information includes X and Y coordinates in association with an installation position ID. The installation position ID is identification information assigned to an installation position (i.e., position where one wireless machine 20 is installed) indicated by the position information. The X coordinate is an X coordinate value of the installation position to which the associated installation position ID is assigned. The Y coordinate is a Y coordinate value of the installation position to which the associated installation position ID is assigned. In the position information, the X coordinate value and the Y coordinate value represent the position (installation position) where the wireless machine 20 is installed. Note that the position may be expressed in three-dimensional coordinates by adding a Z coordinate value.

In the example shown in FIG. 5, the position information storage 103 stores position information including the X coordinate "1" and the Y coordinate "1" in association with the installation position ID "P1". This position information indicates that one wireless machine 20 of the plurality of wireless machines 20 is installed at the installation position in which the installation position ID "P1" is assigned, the X coordinate value is 1, and the Y coordinate value is 1.

The position information storage 103 stores position information including the X coordinate "1" and the Y coordinate "2." in association with the installation position ID "P2". This position information indicates that one wireless machine 20 of the plurality of wireless machines 20 is installed at the installation position in which the installation position ID "P2" is assigned, the X coordinate value is 1, and the Y coordinate value is 2.

While only the position information indicating the installation position to which the installation position IDs "P1" and "P2" are assigned have been described here, the same applies to other position information.

Note that according to the position information shown in FIG. 5, the installation positions (i.e., nine installation positions to which the installation position IDs "P1" to "P9" are assigned) where the plurality of wireless machines 20 (i.e., nine wireless machines 20) are installed can be discriminated, but it is not possible to discriminate as to which wireless machine 20 (wireless machine ID) is installed at each installation position.

Figure 6:
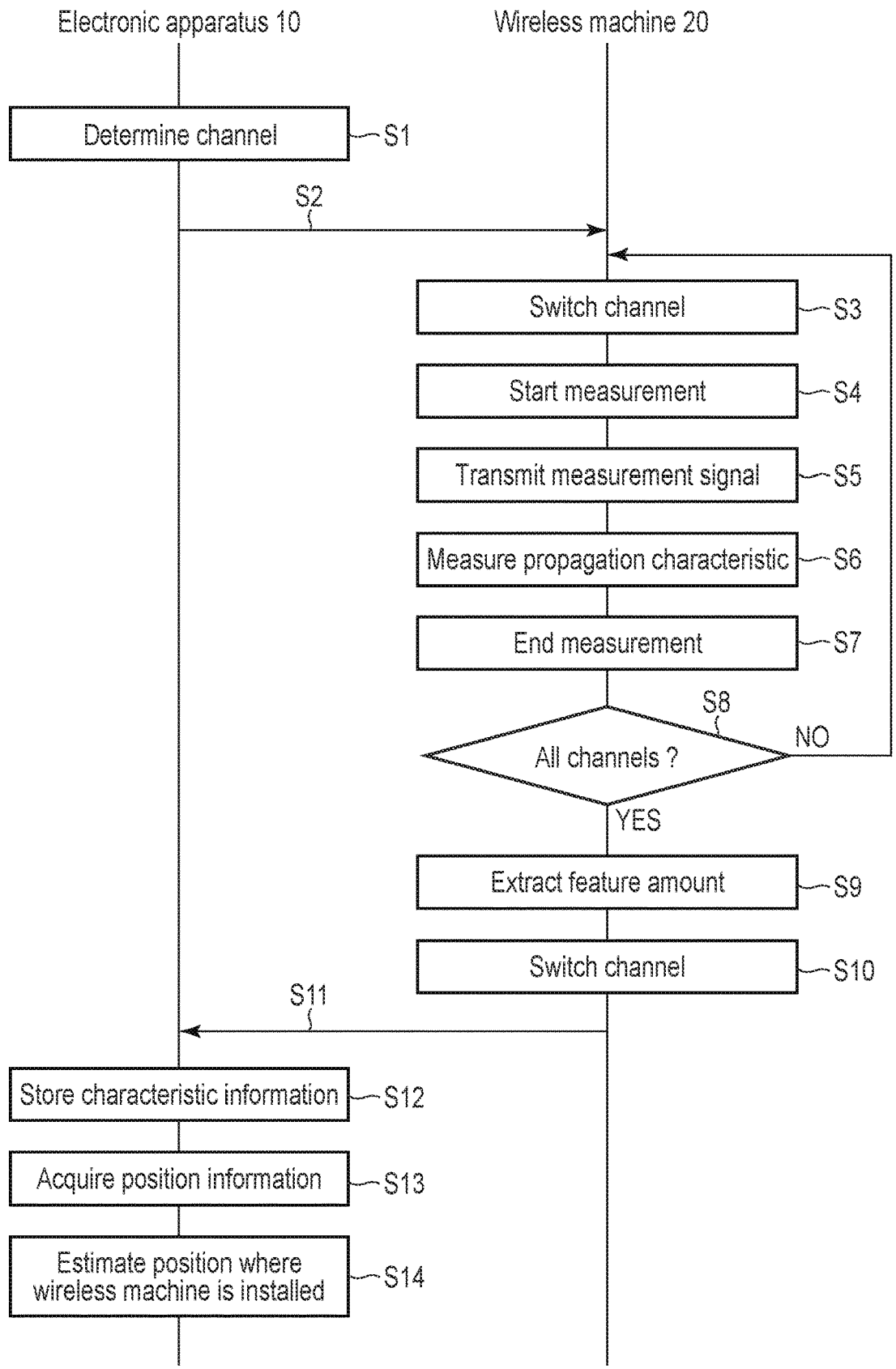
FIG. 6 is a sequence chart showing an example of a processing procedure of the electronic apparatus and a plurality of wireless machines in a case of estimating the position where each of the plurality of wireless machines is installed.

With reference to the sequence chart of FIG. 6, an example of the processing procedure of the electronic apparatus 10 and the plurality of wireless machines 20 in a case of estimating the positions where the plurality of wireless machines 20 are installed will be described below. In FIG. 6, the processing of one wireless machine (hereinafter referred to as a target wireless machine) 20 of the plurality of wireless machines 20 is mainly described, but similar processing is executed also in the other wireless machines 20.

First, the measurement instruction module 101 determines a channel (wireless channel) to be used for measuring propagation characteristics in each of the plurality of wireless machines 20 (step S1). Note that a plurality of channels are determined in step S1.

Next, the measurement instruction module 101 transmits, to the target wireless machine 20, measurement instruction information including a number (hereinafter referred to as a measurement channel number) indicating each of the plurality of channels determined in step S1 (step S2). Note that the measurement instruction information is transmitted to all the wireless machines 20 by broadcast, for example.

Here, the measurement instruction information includes a plurality of measurement channel numbers, and the measurement channel number is only required to be one in which each of the plurality of wireless machines 20 can identify the channel determined in step S. For example, in the case of the 920 MHz band, numbers defined for channels such as 33, 42, 51, and 60 can be used as the measurement channel numbers. The center frequency of the channel or the like may be used as the measurement channel number.

In addition to the measurement channel number described above, the measurement instruction information includes a period (hereinafter referred to as a measurement period) in which the propagation characteristics are measured and a number indicating the channel to be used in each of the plurality of wireless machines 20 after ending the measurement of the propagation characteristics (hereinafter, referred to as a switching destination channel number). The measurement period and the switching destination channel number may be defined in advance, for example, or may be dynamically determined by the measurement instruction module 101.

The measurement period may be an identical period for a plurality of measurement channel numbers (i.e., the plurality of channels determined in step S1) or may be a different period for each of the plurality of measurement channel numbers. When each of the wireless machines includes a timing module and they are synchronized with each other, the measurement period may be a period defined by, for example, the time at which the measurement of the propagation characteristics starts (hereinafter referred to as a measurement start time) and the time at which the measurement of the propagation characteristics ends (hereinafter referred to as a measurement end time). In this case, the measurement instruction information is only required to include the measurement start time and the measurement end time for each measurement channel number.

The switching destination channel number can be, for example, a channel before the measurement of the propagation characteristics is started, but may be another channel. For example, if the channel at the time point when the measurement of the propagation characteristics ended is continuously used, the measurement instruction information may not include the switching destination channel number.

In step S2, the measurement instruction information transmitted from the measurement instruction module 101 (electronic apparatus 10) is received by the target wireless machine 20.

Based on a plurality of measurement channel numbers included in the received measurement instruction information, the target wireless machine 20 switches the channel on which the target wireless machine 20 executes communication (step S3).

Here, as described above, the measurement instruction information includes a plurality of measurement channel numbers, and in the measurement of propagation characteristics, it is necessary to transmit and receive signals between the plurality of wireless machines 20 as described later. Therefore, within the identical measurement period, the channel used (on which communication is performed) by each of the plurality of wireless machines 20 is unified. In this case, in each of the plurality of wireless machines 20, the channels indicated by each of the plurality of measurement channel numbers included in the measurement instruction information shall be used in a predetermined order. The order in which the channels indicated by each of the plurality of measurement channel numbers are used may be in ascending order of the measurement channel numbers or the like, or may be specified by the electronic apparatus 10 (measurement instruction module 101) side. In the case where the order in which the channels are used is specified by the electronic apparatus 10 side, the specified order is only required to be included in the measurement instruction information.

When the channels are switched based on the order described above in step S3, each of the plurality of wireless machines 20 becomes capable of transmitting and receiving signals using the identical channel among the plurality of channels indicated by each of the plurality of measurement channel numbers.

Hereinafter, the channel switched in step S3 (i.e., channel on which the target wireless machine 20 executes communication) will be referred to as a target channel.

Next, the target wireless machine 20 starts measurement of the propagation characteristics (step S4). The processing of step S4 may be executed immediately after the processing of step S3 is executed, or, if the measurement instruction information received by the wireless machine 20 includes the measurement start time, it may be executed upon reaching the measurement start time.

When the measurement of the propagation characteristics is started in step S4, the target wireless machine 20 transmits, by broadcast, a signal for measuring the propagation characteristics (hereinafter referred to as a measurement signal) to the plurality of other wireless machines 20 at random timing (step S5). In this case, the measurement signal is transmitted using the target channel. The measurement signal includes a wireless machine ID (i.e., wireless machine ID of the transmission source of the measurement signal) assigned to the target wireless machine 20. Note that it is also possible to determine the timing, the order, and the like in which the target wireless machine 20 transmits the measurement signals, and in this case, the measurement signals are only required to be transmitted in accordance with the determined timing, order, and the like.

Here, the measurement signal is similarly transmitted by broadcast also from each of the plurality of wireless machines 20 other than the target wireless machine 20. Therefore, the target wireless machine 20 receives the measurement signals transmitted from each of the other wireless machines 20. When the target wireless machine 20 receives the measurement signal, the target wireless machine 20 measures the propagation characteristics in the target channel of the target wireless machine 20 based on the measurement signal (step S6). Note that the propagation characteristics in the present embodiment are only required to represent characteristics related to the wireless communication environment between the target wireless machine 20 and the other wireless machine 20. Specifically, for example, a received signal strength indicator (RSSI) is measured as propagation characteristics.

Note that the target wireless machine 20 receives the measurement signal transmitted from each of the other wireless machines 20 (measurement signal including the wireless machine ID assigned to the other wireless machine 20), and in step S6, based on the measurement signal received by the target wireless machine 20, the propagation characteristics between the target wireless machine 20 and the other wireless machines 20 to which the wireless machine ID included in the measurement signal is assigned are measured. That is, the target wireless machine 20 measures the propagation characteristics for each of the other wireless machines 20 based on the measurement signal transmitted from each of the other wireless machines 20.

The propagation characteristics (propagation characteristics measured for each of the other wireless machines 20) measured based on the measurement information in step S6 are held inside the target wireless machine 20 together with the wireless machine ID included in the measurement information (wireless machine IDs assigned to the other wireless machines 20).

Note that the processing of steps S5 and S6 described above may be executed a plurality of times after the processing of step S4 is executed and before the processing of step S7 to be described later is executed. Thus, for example, when a plurality of measurement signals are received from one of the other wireless machines 20, at least one of the mean value, Maximum value, median value, mode value, and standard deviation of the propagation characteristics (e.g., RSSI) measured based on each of the plurality of measurement signals can be used as the propagation characteristics between the target wireless machine 20 and the other wireless machine 20.

Although FIG. 6 shows that the processing of step S6 is executed after the processing of step S5 is executed for convenience, the processing of steps S5 and S6 may be replaced as appropriate.

Next, the target wireless machine 20 ends the measurement of the propagation characteristics (step S7). The processing of step S7 is executed at the time point when the measurement period measured after the execution of step S4 has elapsed. Note that in a case where the measurement instruction information includes the measurement end time, the processing of step S7 may be executed at the time point when the measurement end time has elapsed.

The measurement of the measurement period described above shall be carried out by using, for example, a timing module (not illustrated) operating synchronously among the plurality of wireless machines 20. The timing module may be incorporated in the target wireless machine 20 such as a TSF timer of IEEE 802.11 for communication control, or may be implemented in the target wireless machine 20 as an application program synchronized by IEEE 1588.

When the processing of step S7 is executed, it is determined whether or not the processing of steps S3 to S7 described above has been executed for all the channels indicated by each of the plurality of measurement channel numbers included in the measurement instruction information (step S8).

If it is determined that the processing has not been executed for all the channels (NO in step S8), the process returns to step S3 and the processing is repeated. In this case, a process of discriminating the channel to be used next based on the order of using the channel described above among the plurality of channels indicated by the plurality of measurement channel numbers included in the measurement instruction information and switching the target channel to the discriminated channel is executed in step S3.

Due to this, in the present embodiment, the propagation characteristics are measured in all the channels instructed by the measurement instruction module 101 (i.e., all the channels indicated by the plurality of measurement channel numbers included in the measurement instruction information).

On the other hand, if it is determined that the processing has been executed for all the channels (YES in step S8), the propagation characteristics of each of the other wireless machines 20 measured in each of the plurality of channels indicated by the plurality of measurement channel numbers are held in the target wireless machine 20. In this case, the target wireless machine 20 extracts the feature amount of the propagation characteristics for each of the other wireless machines 20 (step S9).

The feature amount of the propagation characteristics extracted in step S9 can be obtained as, for example, at least one of the mean value, maximum value, median value, mode value, and standard deviation of the propagation characteristics (RSSI) measured in each of the plurality of channels indicated by the plurality of measurement channel numbers, but may be another feature amount.

When the processing of step S9 is executed, the target wireless machine 20 switches the channel on which the target wireless machine 20 executes communication based on the switching destination channel number included in the measurement instruction information (step S10). Note that if the measurement instruction information does not include the switching destination channel number, the processing of step S10 is not executed, and the current channel (channel switched in step S3) is continuously used in the target wireless machine 20. If all the wireless machines 20 have been notified in advance of that a channel used before starting measurement, for example, is to be used as a specific channel, the channel is used.

When the processing of step S10 is executed, the target wireless machine 20 transmits, to the electronic apparatus 10, characteristic information including the feature amount of the propagation characteristics extracted for each of the other wireless machines 20 (wireless machine ID) in step S9 (step S11). This characteristic information is transmitted to the electronic apparatus 10 together with the wireless machine ID assigned to the target wireless machine 20 so that the electronic apparatus 10 can specify the wireless machine 20 that has transmitted the characteristic information. The processing of step S11 may be executed at the timing when the processing of step S10 is executed, or may be executed in response to an instruction from the electronic apparatus 10 (e.g., measurement instruction module 101).

Here, the processing of steps S3 to S11 described above is executed in each of the plurality of wireless machines 20. Therefore, when the processing of step S11 is executed in each of the plurality of wireless machines 20, the electronic apparatus 10 receives the characteristic information transmitted from each of the plurality of wireless machines 20.

The characteristic information received by the electronic apparatus 10 is stored in the characteristic information storage 102 together with the wireless machine ID assigned to the wireless machine 20 that has transmitted the characteristic information (step S12).

FIG. 7 shows an example of the data structure of characteristic information stored in the characteristic information storage 102. In the example shown in FIG. 7, the plurality of wireless machines 20 are wireless machines D1 to D9, and the characteristic information storage 102 stores characteristic information 102a to 102i (characteristic information of wireless machines D1 to D9) transmitted from the respective wireless machines D1 to D9. Note that "D1" to "D9" shown in FIG. 7 correspond to the wireless machine IDs assigned to the wireless machines D1 to D9, respectively.

The characteristic information 102a is characteristic information transmitted from the wireless machine D1. The characteristic information 102a includes a feature amount (here, RSSI) of the propagation characteristics measured in the wireless machine D1 based on the measurement signal transmitted from the other wireless machines D2 to D9 in association with the wireless machines ID assigned to the wireless machine D1 and the wireless machine IDs assigned to the respective other wireless machines D2 to D9.

Specifically, the characteristic information 102a indicates that the feature amount of the propagation characteristics between the wireless machine D1 and the wireless machine D2 is "−50". Note that this "−50" is, for example, a mean value (i.e., feature amount) of the propagation characteristics between the wireless machine D1 and the wireless machine D2 measured in each of the plurality of channels.

The characteristic information 102a indicates that the feature amount of the propagation characteristics between the wireless machine D1 and the wireless machine D3 is "−55". Note that this "−55" is, for example, a mean value (i.e., feature amount) of the propagation characteristics between the wireless machines D1 and D3 measured in each of the plurality of channels.

Although detailed description is omitted, the same applies to the feature amounts of the propagation characteristics between the wireless machine D1 and each of the other wireless machines D4 to D9 included in the characteristic information 102a. Since the other characteristic information 102b to 102i are the same as the characteristic information 102a, detailed description thereof is omitted here.

Note that, for example, the (feature amount of) propagation characteristics measured in the wireless machine D1 based on the measurement signal transmitted from the wireless machine D2 and the (feature amount of) propagation characteristics measured in the wireless machine D2 based on the measurement signal transmitted from the wireless machine D1 both correspond to the propagation characteristics between the wireless machine D1 and the wireless machine D2, and often become substantially the same values. The same applies to the propagation characteristics between two wireless machines other than the wireless machine D1 and the wireless machine D2 among the plurality of wireless machines D1 to D9. Therefore, the (characteristic information including) propagation characteristics between two of the plurality of wireless machines D1 to D19 may be measured by only one of the wireless machines and stored in the characteristic information storage 102 without distinction between the transmission side wireless machines and the reception side wireless machines. In this case, it becomes possible to reduce the information amount (data amount) stored in the characteristic information storage 102 shown in FIG. 7, for example.

Returning to FIG. 6 again, the estimation module 104 acquires the position information stored in the position information storage 103 (step S13).

Next, based on the characteristic information stored in the characteristic information storage 102 in step S12 and the position information acquired in step S13, the estimation module 104 estimates the position (i.e., correspondence relationship between each of the plurality of installation positions and each of the plurality of wireless machines 20) where each of the plurality of wireless machines 20 is installed from among the plurality of installation positions indicated by the position information (step 314).

To specifically explain the processing in step S14, first, the estimation module 104 generates a plurality of hypotheses of combination of, for example, each installation position indicated by position information with (the wireless machine ID assigned to) each of the plurality of wireless machines 20.

Assuming that the installation positions are P1 to P9 and the plurality of wireless machines 20 are the wireless machines D1 to D9 as described above, the combination of each of the installation positions P1 to P9 and each of the wireless machines D1 to D9 includes various combinations such as "P1-D1, P2-D2, P3-D3, P4-D4, P5-D5, P6-D6, P7-D7, P8-D8, P9-D9", "P1-D9, P2-DA, P3-D7, P4-D6, P5-D5, P6-D4, P7-D3, P8-D2, P9-D1", and "P1-D2, P2-D3, P3-D4, P4-D5, P5-D6, P6-D7, P7-D8, P8-D9, P9-D1".

Next, the estimation module 104 calculates evaluation values for various combinations of each of the installation positions and each of the wireless machines 20 described above, and estimates the position where each of the wireless machines 20 is installed based on the combination for which the highest evaluation value has been calculated. Specifically, if the highest evaluation value is calculated for the combination of, for example, "P1-D2, P2-D3, P3-D4, P4-D5, P5-D6, P6-D7, P7-D8, P8-D9, P9-D1", it is estimated that the wireless machine D2 is installed at the installation position P1, the wireless machine D3 is installed at the installation position P2, the wireless machine D4 is installed at the installation position P3, the wireless machine D5 is installed at the installation position P4, the wireless machine D6 is installed at the installation position P5, the wireless machine D17 is installed at the installation position P6, the wireless machine D8 is installed at the installation position P7, the wireless machine D9 is installed at the installation position P8, and the wireless machine D1 is installed at the installation position P9.

The evaluation value is calculated based on the correlation relationship between the distance between the installation positions indicated by the position information and the propagation characteristics among the wireless machines 20, for example. When RSSI has been measured as the propagation characteristics as described above, a combination in which the RSSI decreases as the distance between the installation positions increases is searched. In the present embodiment, since the RSSI decreases (attenuates) as the distance increases, the combination in which the correlation coefficient, which is an index representing the correlation relationship described above, is closest to −1 is used as the estimation result.

Note that the estimation processing in step S14 may be executed for all combinations in each of the plurality of installation positions and each of the plurality of wireless machines 20, or may be executed for a limited combination using, for example, a genetic algorithm in order to reduce the processing load. Furthermore, this estimation processing may be executed by using artificial intelligence based on machine learning, for example. The estimation method using the correlation coefficient is disclosed in JP 2017-227600 A, for example.

When the processing of FIG. 6 described above is executed, the position where each of the plurality of wireless machines 20 is installed (i.e., correspondence relationship between each of the plurality of installation positions and each of the plurality of wireless machines 20) can be obtained as an estimation result, and the estimation result can be used in various systems, for example.

Specifically, for example, a case in which the correspondence relationship between the positions P1 to P9 and the wireless machines D1 to D9 in the lighting equipment system described in FIG. 1 is estimated is assumed. In this case, assuming that the correspondence relationship (i.e., estimation result) between the positions P1 to P9 and the wireless machines D1 to D9 is, for example, "P1-D2, P2-D3, P3-D4, P4-D5, P5-D6, P6-D7, P7-D8, P8-D9, P9-D1", in the case of performing control such as turning on only the lighting equipment arranged in the room 1a, for example, it is only required to transmit a control signal to the wireless machines D2, D3, and D4. Thus, when the correspondence relationship between the positions P1 to P9 and the wireless machines D1 to D9 is estimated in the lighting equipment system, the lighting equipment can be appropriately controlled using the estimation result.

It is assumed that the correspondence relationship between the positions P1 to P12 and the wireless machines D1 to D12 in the photovoltaic power generation system described in FIG. 2, for example, is estimated. In this case, assuming that the correspondence relationship (i.e., estimation result) between the positions P1 to P12 and the wireless machines D1 to D12 is, for example, "P1-D12, P2-D11, P3-D10, P4-D9, P5-D8, P6-D7, P7-D6, P8-D5, P9-D4, P10-D3, P11-D2, P12-D1", by receiving the power generation amount corresponding to an abnormal value from the wireless machine D8, for example, it is possible to specify that an abnormality has occurred in the solar panel 2e arranged at the position P5 where the wireless machine D8 is installed. In the case where the correspondence relationship between the positions P1 to P12 and the wireless machines D1 to D12 is estimated thus in the photovoltaic power generation system, the state of the solar panel can be appropriately monitored using the estimation result.

Note that FIG. 6 illustrates that a plurality of channels are determined in step S1, but the plurality of channels can be determined sequentially. In this case, the processing of steps S1 to S7 is only required to be repeatedly executed for each channel for which propagation characteristics are to be measured.

Although FIG. 6 illustrates that the feature amount is extracted on the wireless machine (target wireless machine) 20 side, the propagation characteristics (characteristic information) measured on each of the plurality of channels may be transmitted from the wireless machine 20 to the electronic apparatus 10, and the processing of extracting the feature amount of the propagation characteristics may be executed on the electronic apparatus 10 side.

FIG. 6 illustrates that after the processing in step S12 is executed, the processing in step S13 is executed (i.e., position information is acquired), but the processing in step S13 (processing of acquiring position information) may be executed at any timing after the processing shown in FIG. 6 is started before the processing in step S14 is executed.

As described above, in the present embodiment, the characteristic information of the first wireless machine 20 obtained from the first propagation characteristics in the first channel of the first wireless machine 20 and the second propagation characteristics in the second channel of the first wireless machine 20, and the characteristic information of the second wireless machine 20 obtained from the third propagation characteristics in the first channel of the second wireless machine 20 and the fourth propagation characteristics in the second channel of the second wireless machine 20 are received, and based on the position information stored in the position information storage 103, the characteristic information of the first wireless machine 20, and the characteristic information of the second wireless machine 20, the position where the first and second wireless machines 20 are installed is estimated from the first and second installation positions indicated by the position information (i.e., correspondence relationship between each of the plurality of installation positions and each of the plurality of wireless machines 20). Note that in the present embodiment, the positions where the first and second wireless machines 20 are installed correspond to the installation positions of various pieces of equipment where the first and second wireless machines 20 are installed, including the lighting equipment shown in FIG. 1 and the solar panel shown in FIG. 2 described above.

Here, assuming that the position where each of the plurality of wireless machines 20 is installed is estimated based on the RSSI (propagation characteristic) in one channel, for example, in an environment with much reflection of radio waves, a phenomenon called multipath fading, in which direct waves and reflected waves interfere with each other, occurs, and even if the distance between the two wireless machines 20 is the same, the RSSI sometimes drops greatly depending on the installation position (environment) of the two wireless machines 20. When the position where each of the plurality of wireless machines 20 is installed is estimated based on such RSSI, the estimation accuracy of the position is lowered.

However, even if the RSSI drops due to multipath fading in a specific channel, the RSSI can sometimes be measured without being affected by multipath fading in other channels having different wavelengths.

Therefore, in the present embodiment, the influence of multipath fading can be mitigated by using RSSI measured in a plurality of channels, and the estimation accuracy can be improved by enhancing the correlation between the distance between installation positions and RSSI (propagation characteristics).

Note that in the present embodiment, it has been mainly described that the RSSI is used as the propagation characteristics measured by the first and second wireless machines 20, but, for example, packet error rate (PER) or the like may be used as the propagation characteristics.

Furthermore, in the present embodiment, the propagation characteristics in each of the plurality of channels are measured in each of the first and second wireless machines 20, and the feature amounts of the propagation characteristics in the plurality of channels (i.e., feature amount extracted from the propagation characteristics in each of the plurality of channels) are transmitted from the first and second wireless machines 20 to the electronic apparatus 10. With such a configuration, it is not necessary to transmit all of the propagation characteristics in each of the plurality of channels to the electronic apparatus 10, and hence the communication amount from the first and second wireless machines 20 to the electronic apparatus 10 can be reduced, and the electronic apparatus 10 can collect (receive) measurement results in a shorter time.

On the other hand, the propagation characteristics measured in each of the plurality of channels may be transmitted from each of the first and second wireless machines 20 to the electronic apparatus 10, and the feature values of the propagation characteristics measured in the plurality of channels may be extracted (calculated) on the electronic apparatus 10 side. In general, since the electronic apparatus 10 has a higher hardware performance than that of the first and second wireless machines in most cases, such a configuration can more efficiently extract the feature amounts of the propagation characteristics measured in the plurality of channels.

For example, at least one of the mean value, maximum value, median value, mode value, and standard deviation of the propagation characteristics measured in each of the plurality of channels can be used as the feature amount of the propagation characteristics.

In the present embodiment, the instructions about the measurement period (time) of the propagation characteristics of the first and second wireless machines 20 and the third channel (switching destination channel) are given to each of the first and second wireless machines 20. In this case, each of the first wireless machines 20 measures the first and second propagation characteristics based on the instructed measurement period, and switches the channel on which the first wireless machines execute communication to the third channel after the measurement ends. Similarly, each of the second wireless machines 20 measures the third and fourth propagation characteristics based on the instructed measurement period, and switches the channel on which the second wireless machines execute communication to the third channel after the measurement ends. Such a configuration makes it possible to measure the propagation characteristics in each channel of the first and second wireless machines 20 at the identical timing, and to continuously execute communication in the third channel after the measurement ends. The instruction about measurement start time and the measurement end time may be given as the measurement period.

Note that it has been described that in the present embodiment, each of the plurality of wireless machines 20 measures the propagation characteristics with the other wireless machines 20, but for example, the electronic apparatus 10 may measure the propagation characteristics with the wireless machines 20 by receiving a measurement signal from each of the plurality of wireless machines 20, and may estimate the position where each wireless machine 20 is installed based on the measured propagation characteristics.

Furthermore, in the present embodiment, it has been described that the parts 101 to 104 shown in FIG. 4 are included in one device, but the parts 101 to 104 may be arranged in a plurality of devices. That is, the electronic apparatus 10 according to the present embodiment may be implemented by a plurality of devices. Furthermore, for example, the position information storage 103 may be provided in an external server device or the like outside the electronic apparatus 10. In this case, in step S13 shown in FIG. 6 described above, the position information may be acquired (received) from the external server device.

Second Embodiment

Next, the second embodiment will be described. Note that in the present embodiment, parts similar to those in the drawings used in the description of the first embodiment described earlier are given the identical reference numerals for description. Since the usage mode and hardware configuration of the electronic apparatus according to the present embodiment are similar to those of the first embodiment described above, a detailed description thereof will be omitted here. In the following description, parts different from those of the first embodiment described above will be mainly described.

FIG. 8 is a block diagram showing an example of the functional configuration of an electronic apparatus 10 according to the present embodiment. The present embodiment is different from the above-described first embodiment in that the estimation module 104 includes a primary estimation module 104a and a secondary estimation module 104b.

In the above-described first embodiment, the characteristic information including the feature amounts of the propagation characteristics measured in the plurality of channels is transmitted from each of the plurality of wireless machines 20, but in the present embodiment, it is assumed that not the characteristic information including the feature amounts but the characteristic information for each channel obtained from the propagation characteristics measured in each of the plurality of channels is transmitted from each of the plurality of wireless machines 20. That is, in the present embodiment, the characteristic information storage 102 stores the characteristic information for each channel.

Based on the characteristic information stored in the characteristic information storage 102 for each channel and the position information stored in the position information storage 103, the primary estimation module 104a estimates, for each channel, the position (i.e., the correspondence relationship between the installation position and the wireless machine 20) at which each of the plurality of wireless machines 20 is installed from among the plurality of installation positions indicated by the position information.

Based on the result estimated for each channel by the primary estimation module 104a, the secondary estimation module 104b estimates the position where each of the plurality of wireless machines 20 is installed from among the plurality of installation positions indicated by the position information stored in the position information storage 103.

Figure 9:
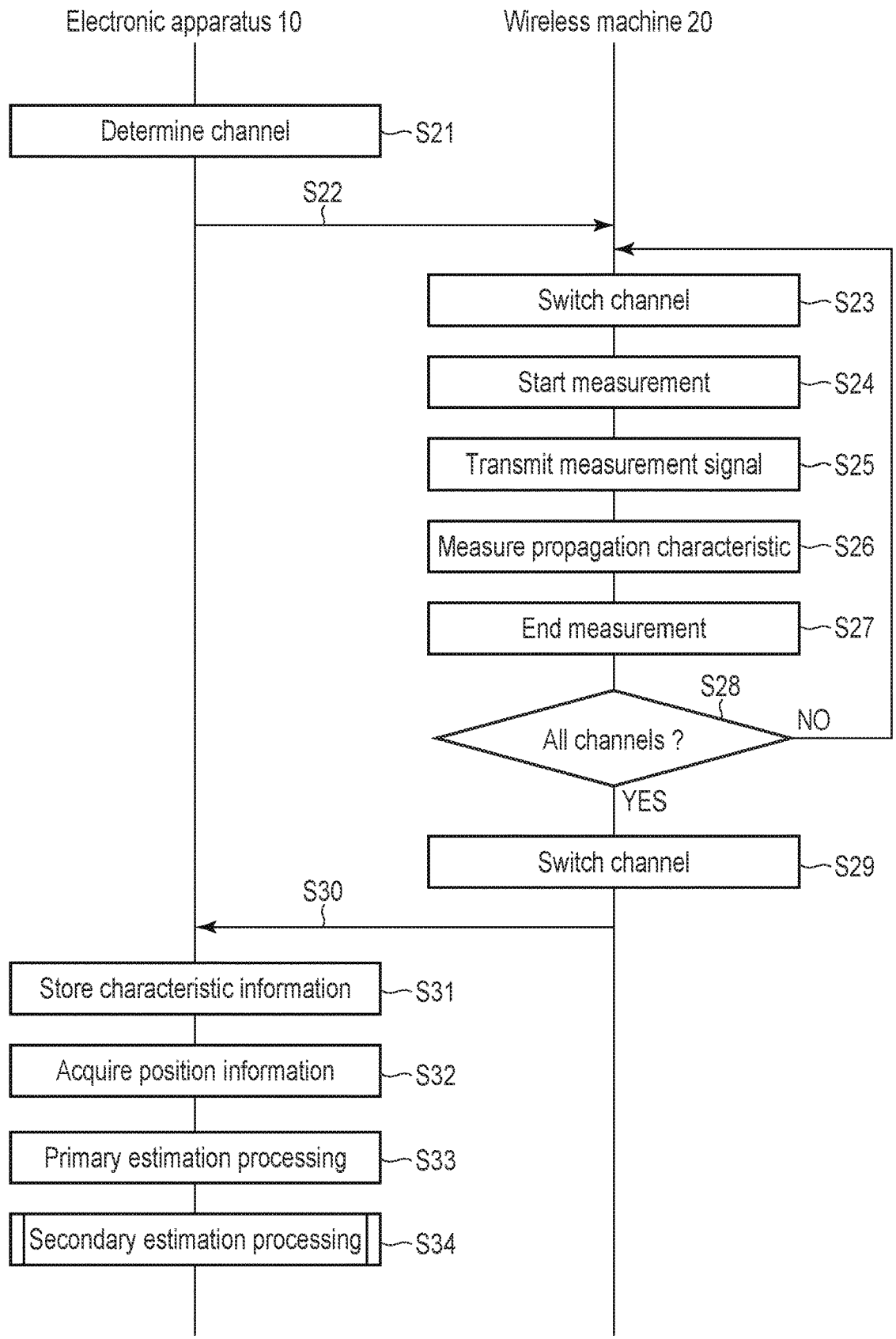
FIG. 9 is a sequence chart showing a processing procedure of the electronic apparatus and the plurality of wireless machines in a case of estimating the position where each of the plurality of wireless machines is installed.

With reference to the sequence chart of FIG. 9, an example of the processing procedure of the electronic apparatus 10 and the plurality of wireless machines 20 when the position where each of the plurality of wireless machines 20 is installed is estimated will be described below. FIG. 9 mainly describes the processing of one wireless machine (hereinafter referred to as a target wireless machine) 20 of the plurality of wireless machines 20, but similar processing is executed also in the other wireless machines 20.

First, the processing of steps S21 to S29 is executed, which corresponds to the processing of steps S1 to S8 and step S10 shown in FIG. 6 described earlier.

Note that in the above-described first embodiment, when it is determined in step S8 that the processing has been executed for all the channels, the feature amount of the propagation characteristics for each of the other wireless machines 20 is extracted by executing the processing of step S9. However, in the present embodiment, processing corresponding to the processing in step S9 is not executed.

When the processing of step S29 is executed, the target wireless machine 20 transmits, to the electronic apparatus 10, characteristic information (i.e., the characteristic information for each channel) obtained from the propagation characteristics of each of the other wireless machines 20 measured in each of the plurality of channels indicated by the plurality of measurement channel numbers held in the target wireless machine 20 (step S30). This characteristic information is transmitted to the electronic apparatus 10 together with the wireless machine ID assigned to the target wireless machine 20. The measurement channel number may also be transmitted. The processing of step S30 may be executed at the timing when the processing of step S29 is executed, or may be executed in response to an instruction from the electronic apparatus 10 (e.g., measurement instruction module 101).

Note that the processing of step S30 may be executed each time the measurement of the propagation characteristics in one of the plurality of channels indicated by the plurality of measurement channel numbers included in the measurement instruction information ends (i.e., processing of step S27 is executed).

Similarly to the processing of steps S5 and S6 shown in FIG. 6, when the processing of steps S25 and S26 are executed a plurality of times, at least one of the mean value, maximum value, median value, mode value, standard deviation, and the like of the propagation characteristics measured based on each of the plurality of measurement signals received from one of the other wireless machines 20 can be obtained as characteristic information between the target wireless machine 20 and the other wireless machine 20.

Here, the processing of steps S23 to S30 described above is executed in each of the plurality of wireless machines 20. Therefore, when the processing of step S30 is executed in each of the plurality of wireless machines 20, the electronic apparatus 10 receives the characteristic information for each channel (measurement channel number) transmitted from each of the plurality of wireless machines 20.

The characteristic information for each channel received by the electronic apparatus 10 is stored in the characteristic information storage 102 together with the wireless machine ID assigned to the wireless machine 20 having transmitted the characteristic information and the measurement channel number indicating the channel (step S31).

FIG. 10 shows an example of the data structure of the characteristic information stored in the characteristic information storage 102. In the example shown in FIG. 10, the plurality of wireless machines 20 are wireless machines D1 to D9, and the characteristic information storage 102 stores characteristic information transmitted from the respective wireless machines D1 to D9.

In the present embodiment, the characteristic information storage 102 stores characteristic information for each channel for which the propagation characteristics are measured. FIG. 10 shows the characteristic information obtained from the propagation characteristics of the wireless machines D1 to D9 in the channel indicated by a measurement channel number 1 and the characteristic information obtained from the propagation characteristics of the wireless machines D1 to D9 in the channel indicated by a measurement channel number 2. Note that although omitted in FIG. 10, characteristic information is similarly stored for channels other than the channels indicated by the measurement channel number 1 and the measurement channel number 2.

Note that the data structure of the characteristic information stored in the characteristic information storage 102 is the same as that described above with reference to FIG. 7 except that the characteristic information is stored for each channel, and hence a detailed description thereof is omitted here.

Returning to FIG. 9 again, the processing of step S32 corresponding to the processing of step S13 shown in FIG. 6 described above is executed.

Next, the primary estimation module 104a executes primary estimation processing based on the characteristic information for each channel stored in the characteristic information storage 102 in step S31 and the position information acquired in step S32 (step S33). This primary estimation processing is similar processing to the processing (estimation processing) executed by the estimation module 104 in the above-described first embodiment, but in the primary estimation processing, the position where each of the plurality of wireless machines 20 is installed is estimated for each channel.

When the processing of step S33 is executed, the secondary estimation module 104b acquires the result of the primary estimation processing for each channel in step S33, and executes the secondary estimation processing (step S34). When the secondary estimation processing is executed, the position where each of the plurality of wireless machines 20 is installed is estimated from among the plurality of installation positions indicated by the position information acquired in step S32, but in the present embodiment, the estimation result (i.e., secondary estimation result) obtained by executing this secondary estimation processing will be used by the various systems described in the above-described first embodiment.

Figure 11:
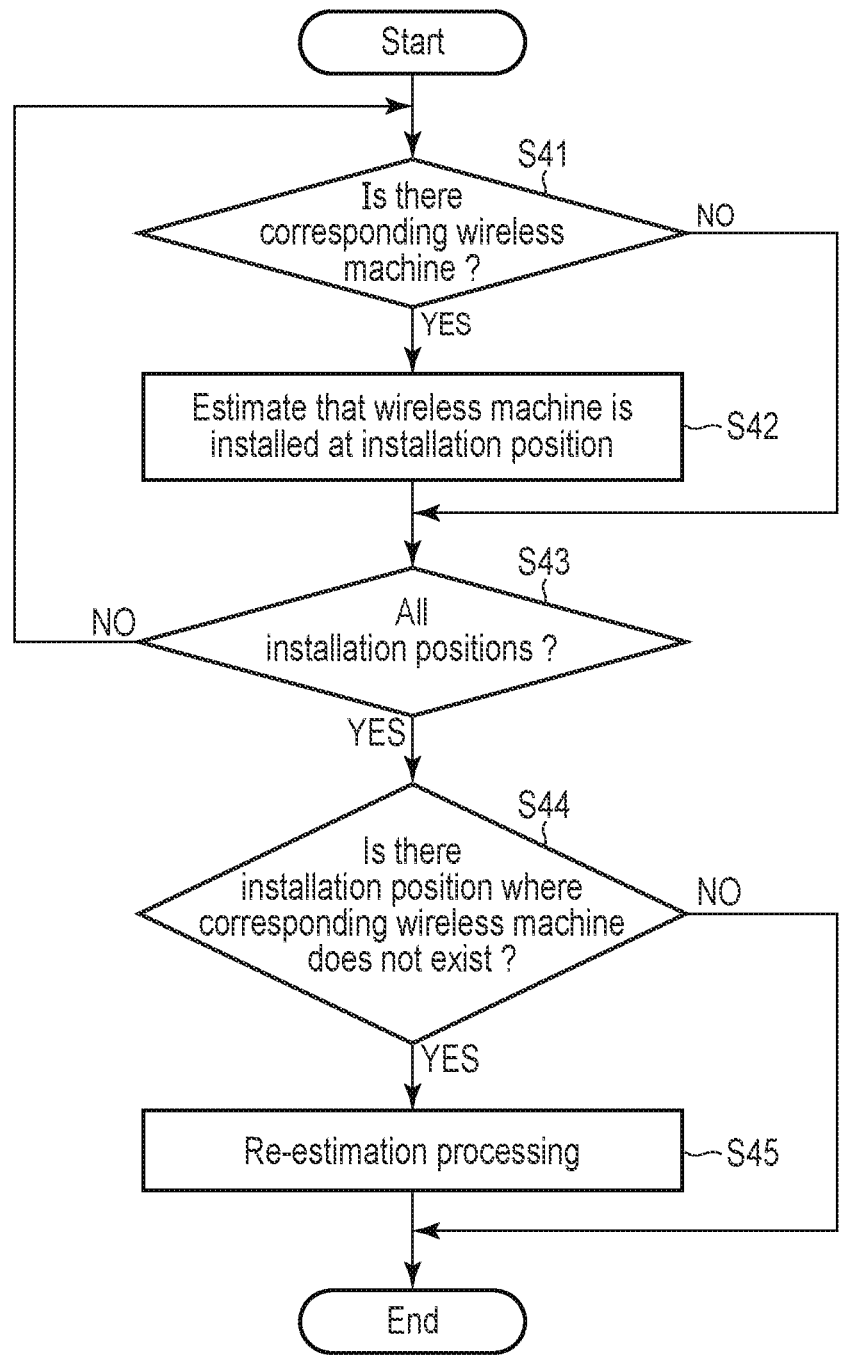
FIG. 11 is a flowchart showing a processing procedure of secondary estimation processing.

Next, the processing procedure of the secondary estimation processing will be described in detail with reference to the flowchart of FIG. 11. The secondary estimation processing shown in FIG. 11 is executed by the secondary estimation module 104b as described above.

Note that when the processing of step S33 shown in FIG. 9 is executed, the secondary estimation module 104b acquires the result of the primary estimation processing for each channel (hereinafter referred to as a primary estimation result) from the primary estimation module 104a. This primary estimation result includes the correspondence relationship (i.e., position where each of the wireless machines 20 is estimated to be installed from among the plurality of installation positions) between each of the plurality of installation positions indicated by the position information described above and (the wireless machine ID assigned to) each of the plurality of wireless machines 20.

In this case, the secondary estimation module 104b executes the following processing of steps S41 and S42 for each of the plurality of installation positions indicated by the position information. Note that in the following description, the installation positions to be subjected to the processing of steps S41 and S42 will be referred to as target installation positions for convenience.

First, the secondary estimation module 104b determines whether or not a wireless machine (hereinafter referred to as a corresponding wireless machine) 20 estimated to be installed at the target installation position in accordance with the primary estimation results, the number of which is equal to or more than a predetermined number, of the primary estimation results for each channel exists (step S41).

If it is determined that the corresponding wireless machine 20 exists (YES in step S41), the secondary estimation module 104b estimates that the corresponding wireless machine 20 is installed at the target installation position (step S42).

On the other hand, if it is determined that the corresponding wireless machine 20 does not exist (NO in step S41), the processing of step S42 is not executed.

Next, it is determined whether or not the processing of steps S41 and S42 has been executed for all the installation positions indicated by the position information (step S43).

If it is determined that the processing has not been executed for all the installation positions (NO in step S43), the process returns to step S41 and the processing is repeated. In this case, the processing of steps S41 and S42 is executed with the installation position where the processing has not been executed as the target installation position.

On the other hand, if it is determined that the processing has been executed for all the installation positions (YES in step S43), the secondary estimation module 104b determines whether or not there is an installation position where the corresponding wireless machine 20 is determined not to exist (i.e., it is not estimated that a specific wireless machine 20 from among the plurality of wireless machines 20 is installed) (step S44).

If it is determined that there is no installation position where the corresponding wireless machine 20 is determined not to exist (NO in step S44), the wireless machine 20 installed at each installation position is specified (estimated), and hence the processing of FIG. 11 is ended.

On the other hand, if it is determined that, there is an installation position where the corresponding wireless machine 20 is determined not to exist (YES in step S44), re-estimation processing is executed for the installation position (step 345). Note that the details of the re-estimation processing will be described later.

Note that in steps S41 and S42, it has been described that the wireless machine 20 estimated to be installed at the target installation position in accordance with the primary estimation results, the number of which is equal to or more than a predetermined number, of the primary estimation results for each channel is assumed to be installed at the target installation position, but in steps S41 and S42, it may be estimated that the wireless machine 20 estimated most frequently to be installed at the target installation position in the primary estimation result for each channel is installed at the target installation position, for example.

The secondary estimation processing shown in FIG. 11 will be specifically described below with reference to FIG. 12. Here, it is assumed that the plurality of installation positions indicated by the position information are installation positions P1 to P6, and the plurality of wireless machines 20 are wireless machines D1 to D6. It is also assumed that the propagation characteristics have been measured in the channels indicated by each of the measurement channel numbers 1 to 3, and the primary estimation result for each channel has been acquired.

As shown in FIG. 12, in the primary estimation result (measurement channel number 1), the installation positions P1 to P6 are associated with the (wireless machine IDs assigned to the) wireless machines D1, D2, D3, D4, D5, and D6, respectively. The primary estimation result (measurement channel number 1) indicates that in the primary estimation processing in the channel indicated by the measurement channel number 1, it has been estimated that the wireless machine D1 is installed at the installation position P1, the wireless machine D2 is installed at the installation position P2, the wireless machine D3 is installed at the installation position P3, the wireless machine D4 is installed at the installation position P4, the wireless machine D5 is installed at the installation position P5, and the wireless machine D6 is installed at the installation position P6.

In the primary estimation result (measurement channel number 2), the installation positions P1 to P6 are associated with the (wireless machine IDs assigned to the) wireless machines D1, D2, D6, D3, D4, and D5, respectively. The primary estimation result (measurement channel number 2) indicates that in the primary estimation processing in the channel indicated by the measurement channel number 2, it has been estimated that the wireless machine D1 is installed at the installation position P1, the wireless machine D2 is installed at the installation position P2, the wireless machine D6 is installed at the installation position P3, the wireless machine D3 is installed at the installation position P4, the wireless machine D4 is installed at the installation position P5, and the wireless machine D5 is installed at the installation position P6.

In the primary estimation result (measurement channel number 3), the installation positions P1 to P6 are associated with the (wireless machine IDs assigned to the) wireless machines D1, D5, D3, D2, D6, and D4, respectively. The primary estimation result (measurement channel number 3) indicates that in the primary estimation processing in the channel indicated by the measurement channel number 3, it has been estimated that the wireless machine D1 is installed at the installation position P1, the wireless machine D5 is installed at the installation position P2, the wireless machine D3 is installed at the installation position P3, the wireless machine D2 is installed at the installation position P4, the wireless machine D6 is installed at the installation position P5, and the wireless machine D4 is installed at the installation position P6.

Here, in the secondary estimation processing described above, with the installation position P1 as the target installation position, it is determined whether or not there is a wireless machine (corresponding wireless machine) estimated to be installed at the installation position P1 in accordance with the primary estimation results, the number of which is equal to or more than a predetermined number, of the three primary estimation results (measurement channel numbers 1 to 3).

Assuming that the predetermined number described above is, for example, 2, it is estimated that the wireless machine D1 is installed at the installation position P1 in all of the three primary estimation results, and hence the secondary estimation module 104b estimates that the wireless machine D1 corresponds to the corresponding wireless machine, and that the wireless machine D1 is installed at the installation position P1 as the secondary estimation result.

Similarly, with the installation position P2 as the target installation position, it is determined whether or not there is a wireless machine (corresponding wireless machine) estimated to be installed at the installation position P2 in accordance with the primary estimation results, the number of which is equal to or more than a predetermined number, of the three primary estimation results (measurement channel numbers 1 to 3).

Assuming that the predetermined number is, for example, 2 as described above, it is estimated that the wireless machine D2 is installed at the installation position P2 in two primary estimation results (measurement channel numbers 1 and 2) of the three primary estimation results, and hence the secondary estimation module 104b estimates that the wireless machine D2 corresponds to the corresponding wireless machine, and that the wireless machine D2 is installed at the installation position P2 as the secondary estimation result.

Furthermore, with the installation position P3 as the target installation position, it is determined whether or not there is a wireless machine (corresponding wireless machine) estimated to be installed at the installation position P3 in accordance with the primary estimation results, the number of which is equal to or more than a predetermined number, of the three primary estimation results (measurement channel numbers 1 to 3).

Assuming that the predetermined number is, for example, 2 as described above, it is estimated that the wireless machine D3 is installed at the installation position P3 in two primary estimation results (measurement channel numbers 1 and 3) of the three primary estimation results, and hence the secondary estimation module 104b estimates that the wireless machine D3 corresponds to the corresponding wireless machine, and that the wireless machine D3 is installed at the installation position P3 as the secondary estimation result.

Next, with the installation position P4 as the target installation position, it is determined whether or not there is a wireless machine (corresponding wireless machine) estimated to be installed at the installation position P4 in accordance with the primary estimation results, the number of which is equal to or more than a predetermined number, of the three primary estimation results (measurement channel numbers 1 to 3).

In this case, as shown in FIG. 12, the wireless machines estimated to be installed at the installation position P4 in the three primary estimation results are the wireless machines D4, D3, and D2, respectively, and it is determined that there is no wireless machine estimated to be installed at the installation position P4 in the primary estimation results equal to or more than a predetermined number (here, 2). Note that it is determined that the corresponding wireless machine does not exist at the installation positions P5 and P6 similarly.

If it is determined that the corresponding wireless machine does not exist at the installation positions P4 to P6 as described above in the secondary estimation processing, the re-estimation processing is executed in step S45 shown in FIG. 11.

An example of the re-estimation processing will be described below with reference to FIG. 13. Note that the upper part of FIG. 13 shows the processing result of the secondary estimation processing before the re-estimation processing described in FIG. 12 is executed. That is, it is assumed a case where as a result of executing the secondary estimation processing (processing of steps S41 to S44 shown in FIG. 11) after the primary estimation result (measurement channel numbers 1 to 3) has been acquired, it is estimated that the wireless machines D1 to D3 are installed in the installation positions P1 to P3, respectively, and it is determined that the corresponding wireless machine does not exist in the installation positions P4 to P6.

In the re-estimation processing, the primary estimation processing is executed again for each channel in consideration of the fact that the wireless machines D1 to D3 are estimated to be installed in the installation positions P1 to P3, respectively, as described above.

Specifically, in the primary estimation processing, evaluation values are calculated for various combinations (hypotheses) of each of the installation positions P1 to P6 and each of the wireless machines D1 to D6 as described in the above-described first embodiment, and the positions where the wireless machines D1 to D6 are installed are estimated based on the combination for which the highest evaluation value has been calculated, but in the primary estimation processing executed again in the re-estimation processing, the position where each of the wireless machines D1 to D6 is installed is estimated based on the combination for which the highest evaluation value has been calculated from among the combinations satisfying the correspondence relationships (P1-D1, P2-D2, and P3-D3) between the installation positions P1 to P3 and the wireless machines D1 to D3 having been already estimated in the secondary estimation processing.

Note that the primary estimation processing may not be executed again for the channel indicated by the measurement channel number 1 having already satisfied the correspondence relationship between the installation positions P1 to P3 and the wireless machines D1 to D3 having been already estimated in the secondary estimation processing.

Here, the lower part of FIG. 13 shows an example of a result (primary estimation result) of the primary estimation processing being executed again in the re-estimation processing.

According to the example shown in the lower part of FIG. 13, in the primary estimation result (measurement channel number 1), the installation positions P1 to P6 are associated with the wireless machines D1, D2, D3, D4, D5, and D6, respectively. In the primary estimation result (measurement channel number 2), the installation positions P1 to P6 are associated with the wireless machines D1, D2, D3, D5, D4, and D6, respectively. In the primary estimation result (measurement channel number 3), the installation positions P1 to P6 are associated with the wireless machines D1, D2, D3, D4, D, and D6, respectively.

In the re-estimation processing, the above-described secondary estimation processing (processing shown in FIG. 11) is executed again based on the result of the primary estimation processing having been executed again.

According to this secondary estimation processing having been executed again, as shown in the lower part of FIG. 13, it can be estimated that the wireless machine D4 is installed at the installation position P4, the wireless machine D5 is installed at the installation position P5, and the wireless machine D6 is installed at the installation position P6.

In a case where it is impossible to estimate the wireless machines installed at all the installation positions even if the secondary estimation processing is executed again in the re-estimation processing described above, the re-estimation processing may be executed again.

Note that in the re-estimation processing, it has been described that the secondary estimation processing is executed again after the primary estimation processing is executed again, but the secondary estimation processing may not be executed again.

Specifically, the evaluation value (e.g., correlation coefficient) is calculated in the primary estimation processing, but it may be configured that the primary estimation result having the highest evaluation value among the primary estimation results for each channel acquired by executing the primary estimation processing again in the re-estimation processing is selected (adopted), and the position where each of the wireless machines D1 to D6 is installed is estimated based on the selected primary estimation result.

Figure 14:
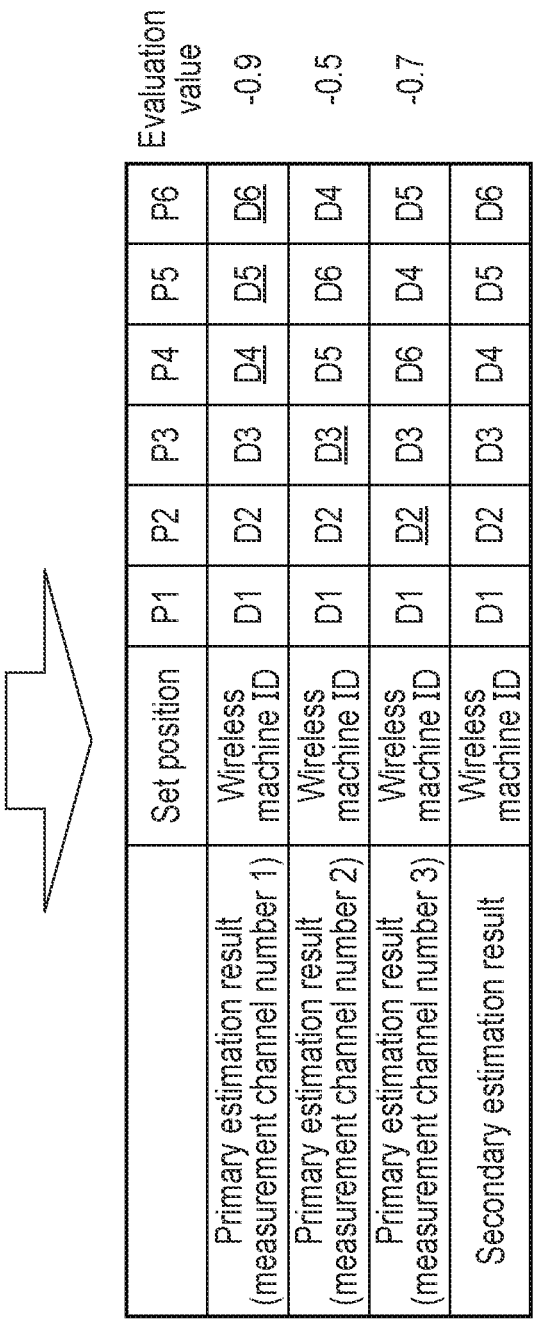
FIG. 14 is a view for explaining another example of the re-estimation processing.

In the case of such a configuration, as shown in FIG. 14, for example, even in a case where the wireless machine installed in the installation positions P4 to P5 cannot be estimated even if the secondary estimation processing is executed again based on the result of the primary estimation processing executed again in the re-estimation processing, it is possible to estimate that the wireless machine D4 is installed at the installation position P4, the wireless machine D5 is installed at the installation position P3, and the wireless machine D6 is installed at the installation position P6, based on the primary estimation result (measurement channel number 1) having a high evaluation value.

Note that in the re-estimation processing described above, the primary estimation processing is executed again using all of the characteristic information stored in the characteristic information storage 102 (propagation characteristics between the wireless machines D1 to D6), but for example, in a case where it has been estimated that the wireless machines D1 to D3 have been installed in the installation positions P1 to P3 before the re-estimation processing is executed, the primary estimation processing in each channel may be executed using only the position information indicating the installation positions P4 to P6 and the characteristic information including the propagation characteristics between the wireless machines D4 to D6 for which the installation positions have not been estimated. In other words, in this primary estimation processing, processing of estimating the position where each of the wireless machines D4 to D6 is installed from among the installation positions P4 to P6 is executed. Even in the case of such a configuration, the estimation result as described in FIG. 13, for example, can be obtained.

As described above, in the present embodiment, based on the position information stored in the position information storage 103, first characteristic information obtained from first propagation characteristics in the first channel of the first wireless machine 20, and third characteristic information obtained from third propagation characteristics in the first channel of the second wireless machine 20, the first estimation result (primary estimation result in the first channel) of the position where each of the first and second wireless machines 20 is installed is acquired, and based on the position information, second characteristic information obtained from second propagation characteristics in the second channel of the first wireless machine 20, and fourth characteristic information obtained from fourth propagation characteristics in the second channel of the second wireless machine 20, the second estimation; result (primary estimation result in the second channel) of the position where each of the first and second wireless machines 20 is installed is acquired. In the present embodiment, based on the above-described first and second estimation results, the position where each of the first and second wireless machines 20 is installed is estimated.

Note in the embodiments, such an expression as "acquiring an estimation result" may mean, for example that a position where each of the first and second wireless machines is installed is estimated and acquired or that (information on) the estimation result is acquired from another module or the like. The estimation result is data based on position information and characteristic information, but may be acquired based on the position information and the characteristic information.

In this case, in a case where it is estimated that an identical wireless machine 20 from among the plurality of wireless machines 20 is installed at an identical position from the first and second installation positions in accordance with the first and second estimation results, the number of which is equal to or more than a predetermined number, it is estimated that the wireless machine 20 is installed at the position. Note that it may be estimated that a specific wireless machine 20 from among the plurality of wireless machines 20 most frequently estimated to be installed at the first installation position in the first and second estimation results is installed at the first installation position, and it may be estimated that a specific wireless machine 20 from among the plurality of wireless machines 20 most frequently estimated to be installed at the second installation position in the first and second estimation results is installed at the second installation position.

In the present embodiment, since, by the configuration described above, the position where each of the first and second wireless machines 20 is installed is estimated in consideration of each of the first estimation result in the first channel and the second estimation result in the second channel, it can be expected that the estimation is less affected by an outlier of the propagation characteristics and the estimation accuracy is improved compared with the case where the position is estimated using the feature amount of the propagation characteristics measured in each of the plurality of channels as in the first embodiment described above.

Furthermore, in the present embodiment, in a case where based on the first and second estimation results, the first and second wireless machines 20 installed at the first and second installation positions from among the plurality of installation positions are estimated and third and fourth wireless machines 20 installed at third and fourth installation positions among the plurality of installation positions cannot be estimated, re-estimation processing of estimating again the position where each of the third and fourth wireless machines 20 is installed from among the third and fourth installation positions is executed.

Specifically, in the re-estimation processing, based on the position information stored in the position information storage 103, the first characteristic information obtained from the first propagation characteristics of the first wireless machine 20, the third characteristic information obtained from the third propagation characteristics of the second wireless machine 20, and the first and second wireless machines 20 estimated to be installed at the first and second installation positions, the third estimation result (primary estimation result in the first channel) of the position where each of the third and fourth wireless machines 20 is installed among the third and fourth installation positions is acquired, and based on the position information, the second characteristic information obtained from the second propagation characteristics of the first wireless machine 20, the fourth characteristic information obtained from the fourth propagation characteristics of the second wireless machine 20, and the first and second wireless machines 20 estimated to be installed at the first and second installation positions, the fourth estimation result (primary estimation result in the second channel) of the position where each of the third and fourth wireless machines 20 is installed among the third and fourth installation positions is acquired. In the re-estimation processing, the position where each of the third and fourth wireless machines 20 is installed is estimated again from among the third and fourth installation positions based on the thus acquired third and fourth estimation results.

According to such a configuration, even if the wireless machines 20 installed at all the installation positions cannot be estimated in the secondary estimation processing (estimation processing based on the first and second estimation results), it becomes possible, by repeatedly executing the re-estimation processing (primary estimation processing and secondary estimation processing), to estimate the wireless machines 20 installed at all the installation positions.

In the re-estimation processing, the positions where the third and fourth wireless machines 20 are installed from the third and fourth installation positions may be estimated again based on the third or fourth estimation result selected based on the first evaluation value for the third estimation result and the second evaluation value for the fourth estimation result. According to such a configuration, since it is not necessary to execute the secondary estimation processing again in the re-estimation processing, the processing load in the electronic apparatus 10 can be reduced.

Furthermore, in the re-estimation processing, based on the position information indicating each of the third and fourth installation positions and the characteristic information of the third and fourth wireless machines 20 other than the first and second wireless machines 20 estimated to be installed at the first and second installation positions, the position where the wireless machine 20 is installed is estimated again from the third and fourth installation positions. According to such a configuration, since it is not necessary to execute the re-estimation processing using all the characteristic information stored in the characteristic information storage 102, the processing load in the electronic apparatus 10 can be reduced.

In at least one of the embodiments described above, it is possible to provide an electronic apparatus and a method capable of highly accurately estimating the position where the wireless machine 20 is installed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising:
a processor configured to:
    acquire position information indicating a plurality of installation positions including first and second installation positions of a plurality of pieces of equipment;
    receive characteristic information of a first piece of equipment among the plurality of pieces of equipment obtained from a first propagation characteristic in a first channel of the first piece of equipment and a second propagation characteristic in a second channel of the first piece of equipment;
    receive characteristic information of a second piece of equipment among the plurality of pieces of equipment obtained from a third propagation characteristic in the first channel of the second piece of equipment and a fourth propagation characteristic in the second channel of the second piece of equipment;
    acquire a first estimation result of a position where each of the first and second pieces of equipment is installed based on the position information, first characteristic information obtained from the first propagation characteristic, and third characteristic information obtained from the third propagation characteristic;
    acquire a second estimation result of the position where each of the first and second pieces of equipment is installed based on the position information, second characteristic information obtained from the second propagation characteristic, and fourth characteristic information obtained from the fourth propagation characteristic; and
    estimate the position where each of the first and second pieces of equipment is installed from among the first and second installation positions, based on the position information, the characteristic information of the first piece of equipment, the characteristic information of the second piece of equipment, and the first and second estimation results, wherein when it is estimated that an identical piece of equipment of the plurality of pieces of equipment is installed at an identical position of the first and second installation positions in accordance with the first and second estimation results, a number of which is equal to or more than a predetermined number, the processor is configured to estimate that the piece of equipment is installed at the position.

2. The electronic apparatus according to claim 1, wherein the processor is configured to estimate the position where each of the first and second pieces of equipment is installed based on a correlation relationship between a distance between the first and second installation positions, the characteristic information of the first piece of equipment, and the characteristic information of the second piece of equipment.

3. The electronic apparatus according to claim 1, wherein:
the characteristic information of the first piece of equipment includes at least one of a mean value, a maximum value, a median value, a mode value, and a standard deviation of the first propagation characteristic and the second propagation characteristic, and
the characteristic information of the second piece of equipment includes at least one of a mean value, a maximum value, a median value, a mode value, and a standard deviation of the third propagation characteristic and the fourth propagation characteristic.

4. The electronic apparatus according to claim 1, wherein the processor is configured to:
calculate, as a first feature amount, at least one of a mean value, a maximum value, a median value, a mode value, and a standard deviation of the first and second propagation characteristics;
calculate, as a second feature amount, at least one of a mean value, a maximum value, a median value, a mode value, and a standard deviation of the third and fourth propagation characteristics; and
estimate positions where the first and second pieces of equipment are installed from among the first and second installation positions based on the position information, the first feature amount, and the second feature amount.

5. The electronic apparatus according to claim 1, further comprising a storage configured to store the position information.

6. An electronic apparatus comprising:
a processor configured to:
acquire position information indicating a plurality of installation positions including first and second installation positions of a plurality of pieces of equipment;
receive characteristic information of a first piece of equipment among the plurality of pieces of equipment obtained from a first propagation characteristic in a first channel of the first piece of equipment and a second propagation characteristic in a second channel of the first piece of equipment;
receive characteristic information of a second piece of equipment among the plurality of pieces of equipment obtained from a third propagation characteristic in the first channel of the second piece of equipment and a fourth propagation characteristic in the second channel of the second piece of equipment;
acquire a first estimation result of a position where each of the first and second pieces of equipment is installed based on the position information, first characteristic information obtained from the first propagation characteristic, and third characteristic information obtained from the third propagation characteristic;
acquire a second estimation result of the position where each of the first and second pieces of equipment is installed based on the position information, second characteristic information obtained from the second propagation characteristic, and fourth characteristic information obtained from the fourth propagation characteristic;
estimate the position where each of the first and second pieces of equipment is installed from among the first and second installation positions, based on the position information, the characteristic information of the first piece of equipment, the characteristic information of the second piece of equipment, and the first and second estimation results;
estimate that a first specific piece of equipment from among the plurality of pieces of equipment most frequently estimated to be installed at the first installation position in the first and second estimation results is installed at the first installation position; and
estimate that a second specific piece of equipment from among the plurality of pieces of equipment most frequently estimated to be installed at the second installation position in the first and second estimation results is installed at the second installation position.

7. An electronic apparatus, comprising:
a processor configured to:
acquire position information indicating a plurality of installation positions including first and second installation positions of a plurality of pieces of equipment;
receive characteristic information of a first piece of equipment among the plurality of pieces of equipment obtained from a first propagation characteristic in a first channel of the first piece of equipment and a second propagation characteristic in a second channel of the first piece of equipment;
receive characteristic information of a second piece of equipment among the plurality of pieces of equipment obtained from a third propagation characteristic in the first channel of the second piece of equipment and a fourth propagation characteristic in the second channel of the second piece of equipment;
acquire a first estimation result of a position where each of the first and second pieces of equipment is installed based on the position information, first characteristic information obtained from the first propagation characteristic, and third characteristic information obtained from the third propagation characteristic;
acquire a second estimation result of the position where each of the first and second pieces of equipment is installed based on the position information, second characteristic information obtained from the second propagation characteristic, and fourth characteristic information obtained from the fourth propagation characteristic;
estimate the position where each of the first and second pieces of equipment is installed from among the first and second installation positions, based on the position information, the characteristic information of the first piece of equipment, the characteristic information of the second piece of equipment, and the first and second estimation results; and when based on the first and second estimation results, the first and second pieces of equipment installed at the first and second installation positions among the plurality of installation positions are estimated, and third and fourth pieces of equipment among the plurality of pieces of equipment installed at third and fourth installation positions among the plurality of installation positions cannot be estimated, estimate a position where each of the third and fourth pieces of equipment is installed from among the third and fourth installation positions.

8. The electronic apparatus according to claim 7, wherein the processor is configured to:

acquire, based on the position information, the first characteristic information obtained from the first propagation characteristic, the third characteristic information obtained from the third propagation characteristic, and the first and second pieces of equipment estimated to be installed at each of the first and second installation positions, a third estimation result of the position where each of the third and fourth pieces of equipment is installed from among the third and fourth installation positions;

acquire, based on the position information, the second characteristic information obtained from the second propagation characteristic, the fourth characteristic information obtained from the fourth propagation characteristic, and the first and second pieces of equipment estimated to be installed at each of the first and second installation positions, a fourth estimation result of the position where each of the third and fourth pieces of equipment is installed from among the third and fourth installation positions; and estimate the position where each of the third and fourth pieces of equipment is installed from among the third and fourth installation positions based on the third and fourth estimation results.

9. The electronic apparatus according to claim 8, wherein the processor is configured to:

calculate a first evaluation value for the third estimation result and a second evaluation value for the fourth estimation result; and estimate positions where the third and fourth pieces of equipment are installed from among the third and fourth installation positions based on a third or fourth estimation result selected based on the first and second evaluation values.

10. The electronic apparatus according to claim 7, wherein based on position information indicating each of the third and fourth installation positions and characteristic information of the third and fourth pieces of equipment other than the first and second pieces of equipment estimated to be installed at the first and second installation positions, the processor is configured to estimate a position where the third and fourth pieces of equipment are installed from among the third and fourth installation positions.

11. An electronic apparatus, comprising:

a processor configured to:

acquire position information indicating a plurality of installation positions including first and second installation positions of a plurality of pieces of equipment;

receive characteristic information of a first piece of equipment among the plurality of pieces of equipment obtained from a first propagation characteristic in a first channel of the first piece of equipment and a second propagation characteristic in a second channel of the first piece of equipment;

receive characteristic information of a second piece of equipment among the plurality of pieces of equipment obtained from a third propagation characteristic in the first channel of the second piece of equipment and a fourth propagation characteristic in the second channel of the second piece of equipment; and estimate the position where each of the first and second pieces of equipment is installed from among the first and second installation positions, based on the position information, the characteristic information of the first piece of equipment, and the characteristic information of the second piece of equipment, wherein:

the processor is configured to give, to each of the first and second pieces of equipment, an instruction about a measurement period of a propagation characteristic in the first and second pieces of equipment and a third channel, the first piece of equipment is configured to measure the first and second propagation characteristics based on the instructed measurement period, and after the measurement ends, switch a channel on which the first piece of equipment executes communication to the instructed third channel, and the second piece of equipment is configured to measure the third and fourth propagation characteristics based on the instructed measurement period, and after the measurement ends, switch a channel on which the second piece of equipment executes communication to the instructed third channel.

12. The electronic apparatus according to claim 11, wherein the processor is configured to give an instruction about a measurement start time and a measurement end time of a propagation characteristic in the first channel and a propagation characteristic in the second channel as the measurement period.

13. A method executed by an electronic apparatus, the method comprising:

acquiring position information indicating a plurality of installation positions including first and second installation positions of a plurality of pieces of equipment;

receiving characteristic information of a first piece of equipment among the plurality of pieces of equipment obtained from a first propagation characteristic in a first channel of the first piece of equipment a second propagation characteristic in a second channel of the first piece of equipment;

receiving characteristic information of a second piece of equipment among the plurality of pieces of equipment obtained from a third propagation characteristic in the first channel of the second piece of equipment and a fourth propagation characteristic in the second channel of the second piece of equipment; and estimating the position where each of the first and second pieces of equipment is installed from among the first and second installation positions, based on the position information, the characteristic information of the first piece of equipment, and the characteristic information of the second piece of equipment, wherein the estimating includes:

acquiring a first estimation result of a position where each of the first and second pieces of equipment is installed based on the position information, first characteristic information obtained from the first propagation characteristic, and third characteristic information obtained from the third propagation characteristic;

acquiring a second estimation result of the position where each of the first and second pieces of equipment is installed based on the position information, second characteristic information obtained from the second propagation characteristic, and fourth characteristic information obtained from the fourth propagation characteristic;

estimating the position where each of the first and second pieces of equipment is installed based on the first and second estimation results; and when it is estimated that an identical piece of equipment of the plurality of pieces of equipment is installed at an identical position of the first and second installation positions in accordance with the first and second estimation results, a number of which is equal to or more than a predetermined number, estimating that the piece of equipment is installed at the position.

14. An electronic system, comprising:

a plurality of pieces of equipment; and a processor configured to:

acquire position information indicating a plurality of installation positions including first and second installation positions of the plurality of pieces of equipment;

receive characteristic information of a first piece of equipment among the plurality of pieces of equipment obtained from a first propagation characteristic in a first channel of the first piece of equipment and a second propagation characteristic in a second channel of the first piece of equipment;

receive characteristic information of a second piece of equipment among the plurality of pieces of equipment obtained from a third propagation characteristic in the first channel of the second piece of equipment and a fourth propagation characteristic in the second channel of the second piece of equipment;

acquire a first estimation result of a position where each of the first and second pieces of equipment is installed based on the position information, first characteristic information obtained from the first propagation characteristic, and third characteristic information obtained from the third propagation characteristic;

acquire a second estimation result of the position where each of the first and second pieces of equipment is installed based on the position information, second characteristic information obtained from the second propagation characteristic, and fourth characteristic information obtained from the fourth propagation characteristic; and estimate the position where each of the first and second pieces of equipment is installed from among the first and second installation positions, based on the position information, the characteristic information of the first piece of equipment, the characteristic information of the second piece of equipment, and the first and second estimation results, wherein when it is estimated that an identical piece of equipment of the plurality of pieces of equipment is installed at an identical position of the first and second installation positions in accordance with the first and second estimation results, a number of which is equal to or more than a predetermined number, the processor is configured to estimate that the piece of equipment is installed at the position.

* * * * *